United States Patent
Takahashi et al.

(10) Patent No.: US 11,397,376 B2
(45) Date of Patent: Jul. 26, 2022

(54) IMAGE PROCESSING DEVICE AND METHOD FOR SUPPRESSING A REDUCTION IN IMAGE QUALITY

(71) Applicant: SONY CORPORATION, Tokyo (JP)

(72) Inventors: Noriaki Takahashi, Tokyo (JP); Takahiro Nagano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 21 days.

(21) Appl. No.: 16/644,821

(22) PCT Filed: Aug. 29, 2018

(86) PCT No.: PCT/JP2018/031872
§ 371 (c)(1),
(2) Date: Mar. 5, 2020

(87) PCT Pub. No.: WO2019/054179
PCT Pub. Date: Mar. 21, 2019

(65) Prior Publication Data
US 2021/0074243 A1 Mar. 11, 2021

(30) Foreign Application Priority Data
Sep. 12, 2017 (JP) .............................. JP2017-174901

(51) Int. Cl.
*G03B 21/12* (2006.01)
*H04N 13/125* (2018.01)
(Continued)

(52) U.S. Cl.
CPC ............. *G03B 21/12* (2013.01); *G03B 21/00* (2013.01); *G06T 5/002* (2013.01); *G09G 5/36* (2013.01);
(Continued)

(58) Field of Classification Search
CPC ........ G03B 21/00; G03B 21/12; G06T 5/002; G06T 2207/20172; G09G 5/00;
(Continued)

(56) References Cited

U.S. PATENT DOCUMENTS

| | | | | |
|---|---|---|---|---|
| 9,210,412 B2* | 12/2015 | Ueki | | G02B 30/25 |
| 2007/0035555 A1* | 2/2007 | Tsukagoshi | | H04N 13/359 |
| | | | | 345/589 |
| 2007/0097104 A1* | 5/2007 | Kuroki | | H04N 9/12 |
| | | | | 345/204 |

(Continued)

FOREIGN PATENT DOCUMENTS

| | | | | |
|---|---|---|---|---|
| JP | 2004015204 A | * | 1/2004 | ............. G03B 21/00 |
| JP | 2004-266808 A | | 9/2004 | |

(Continued)

*Primary Examiner* — Magda Cruz
(74) *Attorney, Agent, or Firm* — Paratus Law Group, PLLC

(57) ABSTRACT

There is provided an image processing device, an image projection device, a control device, an information processing device, an image projection system, an image processing method, and a program that make it possible to suppress a reduction in a subjective image quality. On the basis of each frame image of a moving image, a time during which a projection image of each frame image of the moving image is viewable by a user is controlled. For example, a controller controls the time during which the projection image is viewable by the user, to cause a difference between the moving image and the projection image due to a reduction in a luminance and a difference between the moving image and the projection image, which increases due to an increase in the time during which the projection image is viewable by the user, to be suppressed.

20 Claims, 30 Drawing Sheets

(51) Int. Cl.
    *G03B 21/00*     (2006.01)
    *G06T 5/00*     (2006.01)
    *G09G 5/36*     (2006.01)

(52) U.S. Cl.
    CPC . *H04N 13/125* (2018.05); *G06T 2207/20172* (2013.01)

(58) Field of Classification Search
    CPC ...... G09G 5/36; H04N 13/125; H04N 13/341; H04N 13/363; H04N 5/66; H04N 5/74
    See application file for complete search history.

(56) References Cited

U.S. PATENT DOCUMENTS

| | | | | |
|---|---|---|---|---|
| 2008/0225187 | A1* | 9/2008 | Yamanaka | H04N 9/3167 349/1 |
| 2013/0038745 | A1* | 2/2013 | Myokan | G06T 7/97 348/208.99 |
| 2013/0201403 | A1* | 8/2013 | Iversen | H04N 13/39 348/659 |
| 2015/0289345 | A1* | 10/2015 | Lee | H05B 47/19 315/153 |
| 2016/0133201 | A1* | 5/2016 | Border | G02B 27/0176 345/694 |
| 2016/0253934 | A1* | 9/2016 | Wu | H04N 13/344 345/690 |
| 2019/0172423 | A1* | 6/2019 | Kurokawa | H04N 9/3188 |

FOREIGN PATENT DOCUMENTS

| | | | | |
|---|---|---|---|---|
| JP | 2005-136868 | A | | 5/2005 |
| JP | 2006-195206 | A | | 7/2006 |
| JP | 2009-110028 | A | | 5/2009 |
| JP | 2011-259070 | A | | 12/2011 |
| JP | 2012-103357 | A | | 5/2012 |
| JP | 2012-151641 | A | | 8/2012 |
| JP | 2012151641 | A | * | 8/2012 ............. G02B 27/22 |
| WO | WO-2017061086 | A1 | * | 4/2017 ............. G09G 3/001 |

* cited by examiner

IMAGE PROCESSING DEVICE AND METHOD FOR SUPPRESSING A REDUCTION IN IMAGE QUALITY

CROSS REFERENCE TO PRIOR APPLICATION

This application is a National Stage Patent Application of PCT International Patent Application No. PCT/JP2018/031872 (filed on Aug. 29, 2018) under 35 U.S.C. § 371, which claims priority to Japanese Patent Application No. 2017-174901 (filed on Sep. 12, 2017), which are all hereby incorporated by reference in their entirety.

TECHNICAL FIELD

The present disclosure relates to an image processing device and an image processing method, and more particularly, to an image processing device and an image processing method that make it possible to suppress a reduction in a subjective image quality.

BACKGROUND ART

There have been methods of distributing and projecting a high frame rate image to a low frame rate image projection device (for example, see PTLs 1 to 3).

CITATION LIST

Patent Literature

PTL 1: Japanese Unexamined Patent Application Publication No. 2009-110028
PTL 2: Japanese Unexamined Patent Application Publication No. 2005-136868
PTL 3: Japanese Unexamined Patent Application Publication No. 2004-266808

SUMMARY OF THE INVENTION

Problems to be Solved by the Invention

However, in these cases, since a plurality of frame images is projected at the same time point, a superimposition blur occurs in a motion part, and a subjective image quality may be reduced. In addition, a method in which a projection time of each frame image is reduced so that projection images of the respective frame images are not superimposed upon each other may be considered, but in this case, a luminance of the projection image may be reduced and the subjective image quality may be reduced.

The present disclosure has been made in view of the above circumstances, and makes it possible to suppress the reduction in the subjective image quality.

Means for Solving the Problems

An image processing device according to one aspect of the present technology includes a controller that controls, on a basis of each frame image of a moving image, a time during which a projection image of each frame image of the moving image is viewable by a user.

An image processing method according to one aspect of the present technology includes controlling, on a basis of each frame image of a moving image, a time during which a projection image of each frame image of the moving image is viewable by a user.

In the image processing device and the image processing method according to one aspect of the present technology, the time during which the projection image of each frame image of the moving image is viewable by the user is controlled on the basis of each frame image of the moving image.

Effects of the Invention

According to the present disclosure, it is possible to process an images. In particular, it is possible to suppress a reduction in a subjective image quality.

MODES FOR CARRYING OUT THE INVENTION

Hereinafter, modes (hereinafter referred to as embodiments) for carrying out the present disclosure will be described. Note that the description will be made in the following order.
1. High Frame Rate Image Projection with Plurality of Projection Devices
2. First Embodiment (Image Projection System/Control of Output Time)
3. Second Embodiment (Image Projection System/Control of Output Time and Luminance)
4. Stereoscopic Image Projection by Active Shutter Scheme
5. Third Embodiment (Image Projection System/Control of Output Time)
6. Fourth Embodiment (Image Projection System/Control of Output Time and Luminance)
7. Fifth Embodiment (Image Projection System/Other Configuration Examples)
8. Others

1. High Frame Rate Image Projection with Plurality of Projection Devices

[Image Projection System]

Figure 1:
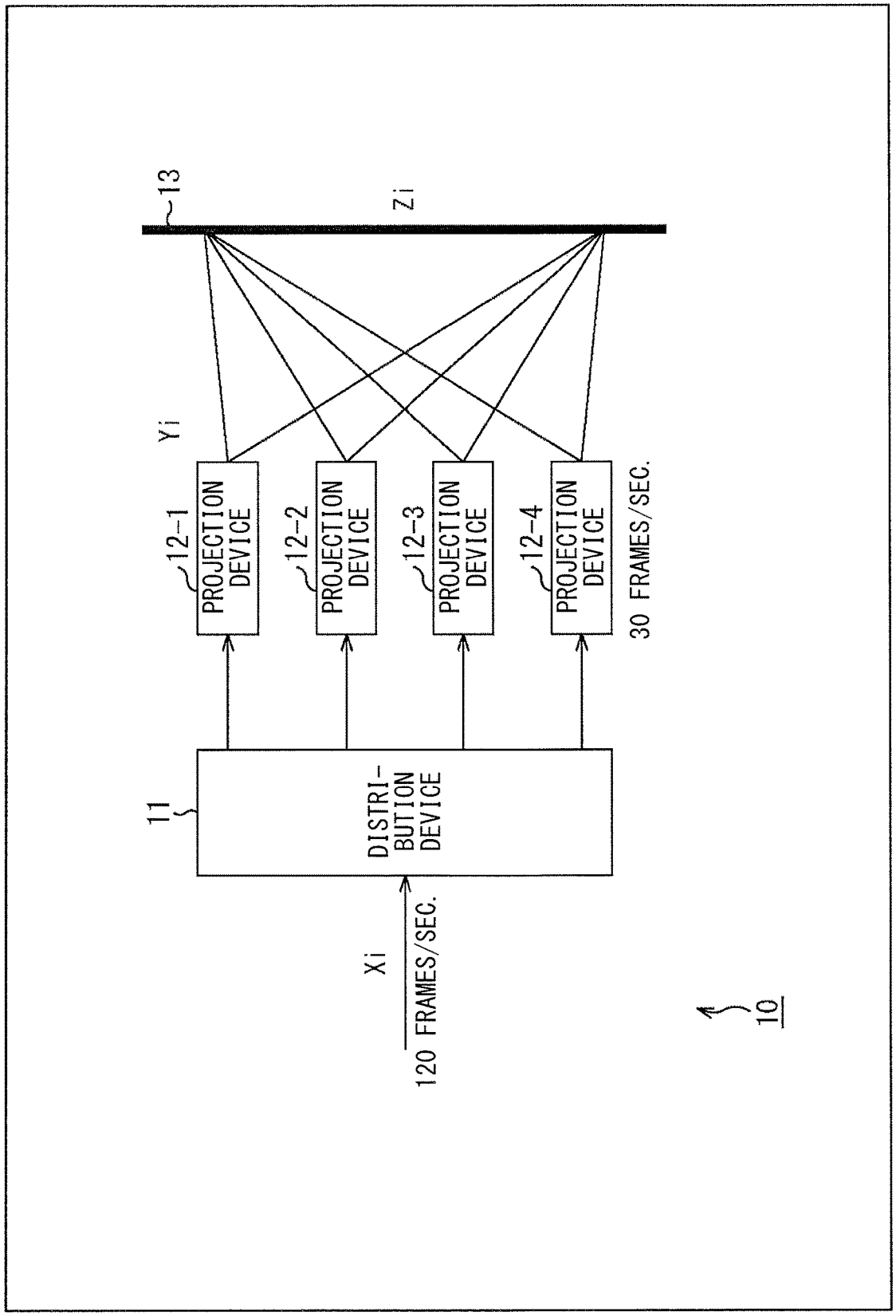
FIG. 1 is a block diagram illustrating a main configuration example of an image projection system.

For example, as described in PTLs 1 to 3, there has been a method of distributing and projecting a high frame rate image to a low frame rate image projection device. For example, an image projection system 10 illustrated in FIG. 1 is a system in which a moving image is projected by four projection devices 12 (projection devices 12-1 to 12-4).

Figure 2:
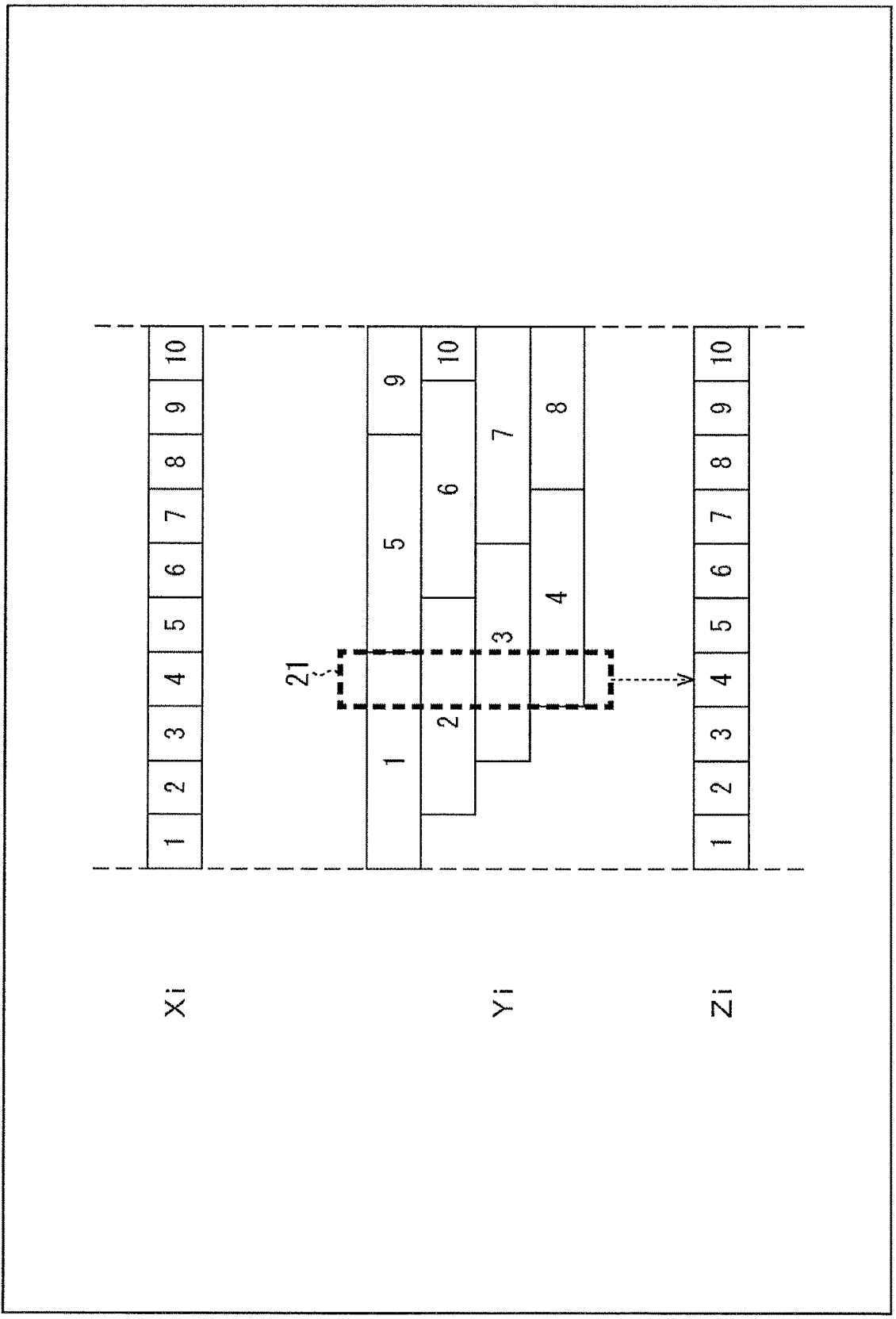
FIG. 2 is a diagram for explaining an example of a state of an image projection.

A frame rate of a moving image (also referred to as input image) to be inputted to the image projection system 10 is 120 frames per second. In contrast, the projection devices 12-1 to 12-4 project images at 30 frames per second, respectively. Accordingly, as illustrated in FIG. 2, the distribution device 11 cyclically distributes frame images of the input image to the projection devices 12-1 to 12-4 in sequence. The projection devices 12-1 to 12-4 sequentially projects the frame images distributed to themselves. Since the frame rate of the projection device 12 is 30 frames per second, each projection device 12 is supplied with the next frame image from the distribution device 11 at the time when the projection of the previous frame image is completed. Thus, each projection device 12 projects the next frame image. In this manner, the projection devices 12 each project a frame image at a timing shifted by $1/120$ second from each other.

For example, the projection device 12-1 projects the frame images of frame numbers 1, 5, 9, . . . , the projection device 12-2 projects the frame images of frame numbers 2, 6, 10, . . . , each at a timing that is $1/120$ second later therefrom, the projection device 12-3 projects the frame images of frame numbers 3, 7, 11, . . . , each at a timing that is $1/120$ second later therefrom, and the projection device 12-4 projects the frame images of frame numbers 4, 8, 12, . . . , each at a timing that is $1/120$ second later therefrom.

Therefore, the projection image projected on a screen 13 is an image on which the images projected from the respective projection devices 12 are superimposed upon each other. For example, as indicated by a dotted line frame 21, the projection image of the frame number 4 is an image in which the frame image of the frame number 1 projected from the projection device 12-1, the frame image of the frame number 2 projected from the projection device 12-2, the frame image of the frame number 3 projected from the projection device 12-3, and the frame image of the frame number 4 projected from the projection device 12-4 are superimposed upon each other. As illustrated in FIG. 2, the frame images thus superimposed upon each other changes every $1/120$ second. That is, since the projection image change every $1/120$ second, the frame rate of the projection image is 120 frames per second.

However, in the case of this method, frame images differing in time points are superimposed upon each other in the projection image, as indicated by the dotted line frame 21 in FIG. 2. For this reason, in the case of images having motion, there is a possibility that a superimposition blur may occur in the moving portion, and the subjective image quality may be reduced.

Figure 3:
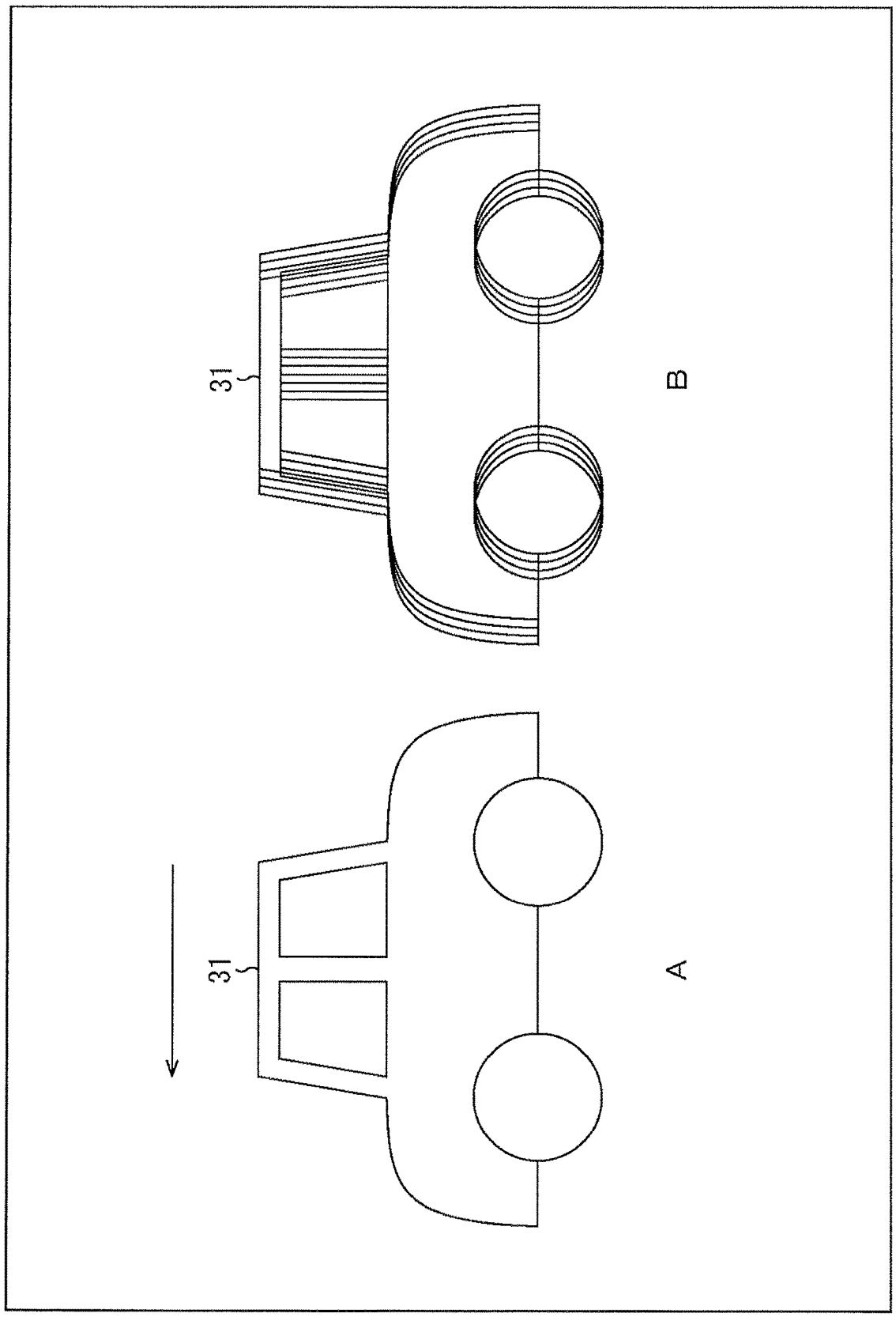
FIG. 3 is a diagram illustrating an example of a projection image.

For example, in a case where the input image is a moving image in which a vehicle 31 moves from right to left as illustrated in A of FIG. 3, since positions of the vehicle 31 in the respective frame images differ, if the frame images are superimposed upon each other, the positions of the vehicle 31 are mutually displaced and superimposed upon each other as in the example illustrated in B of FIG. 3, and a so-called superimposition blur that appears as an afterimage occurs. Accordingly, there has been a possibility that the subjective image quality may be reduced.

Figure 4:
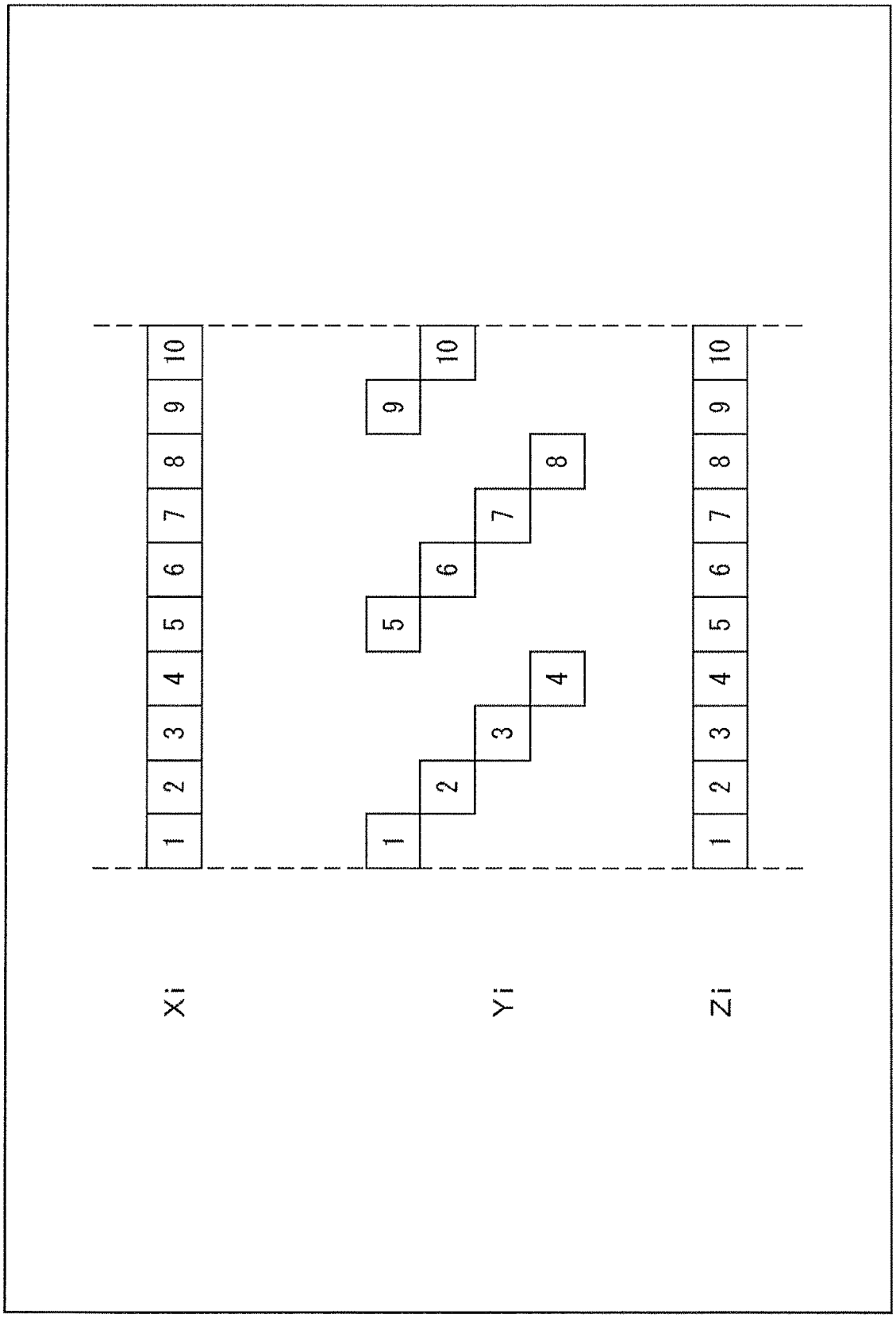
FIG. 4 is a diagram for explaining an example of a state of the image projection.

In contrast, for example, as illustrated in FIG. 4, it is conceivable that each projection device 12 projects each frame image for only $1/120$ second. By doing so, since the images projected from the respective projection devices 12 are not superimposed upon each other in the projection image, it is possible to suppress the occurrence of the superimposition blur. However, in this case, the brightness is reduced by a factor of four as compared with the case of FIG. 2, so that there is possibility that the subjective image quality may be reduced.

[Control on Projection Image-Viewable Time]

On the basis of each frame image of the moving image, the time during which the projection image of each frame image of the moving image is viewable by the user is controlled. For example, the image processing device includes a controller that controls the time during which the projection image of each frame image of the moving image is viewable by the user on the basis of each frame image of the moving image. By doing so, it is possible to project the moving image so that the difference between the input image and the projection image become smaller. In other words, it is possible to suppress a reduction in the subjective image quality.

2. First Embodiment (Image Projection System/Control of Output Time)

[Image Projection System]

Figure 5:
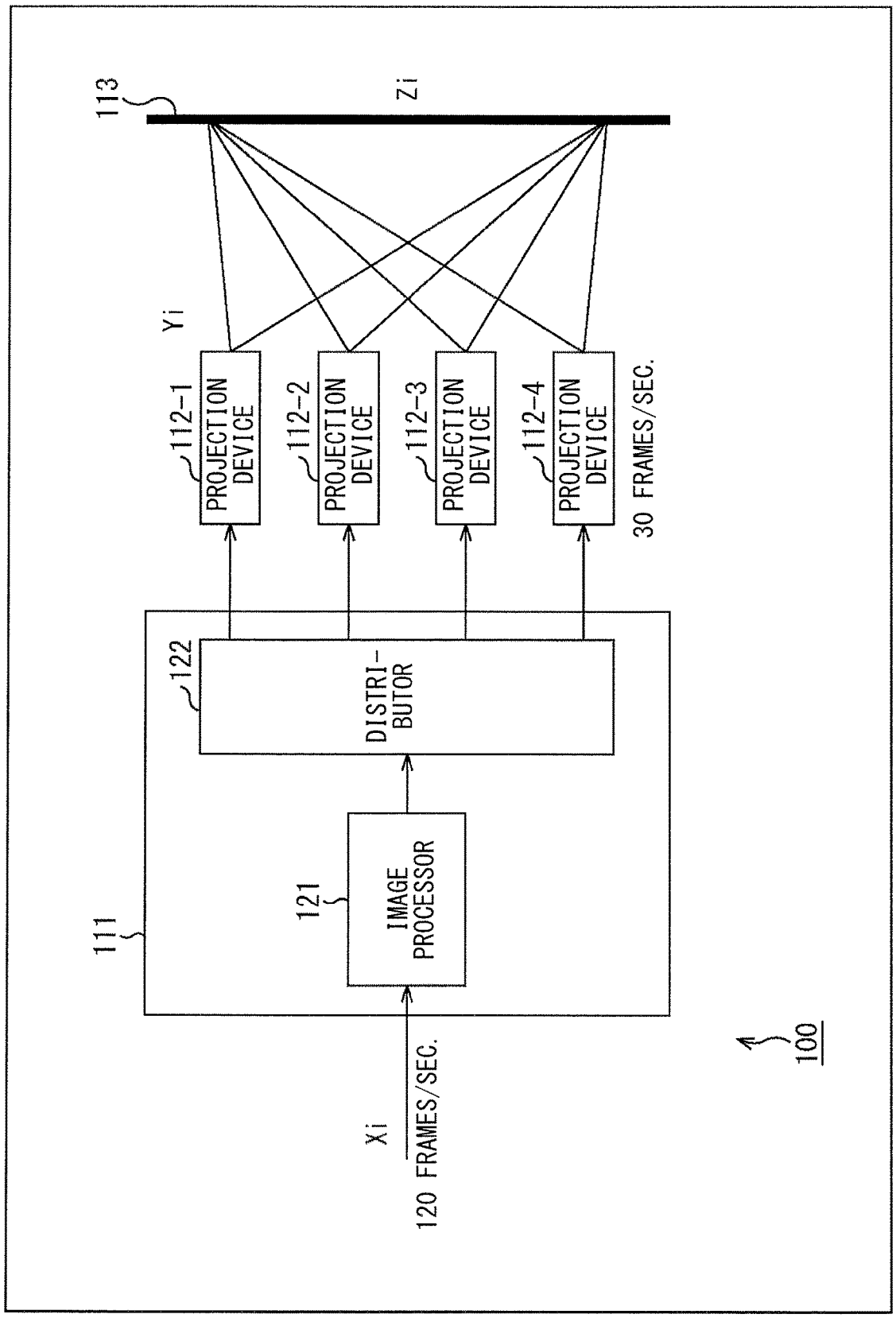
FIG. 5 is a block diagram illustrating a main configuration example of the image projection system.

FIG. 5 is a block diagram illustrating a main configuration example of an embodiment to which the present technology is applied. In FIG. 5, an image projection system 100 is a system that makes it possible to project a moving image having a frame rate higher than a frame rate of a projection device by projecting frame images of a moving image (also referred to as input image) to be inputted using cyclically a plurality of projection devices.

As illustrated in FIG. 5, the image projection system 100 has a central processing unit 111 and projection devices 112-1 to 112-4. The central processing unit 111 is an embodiment of the image processing device to which the present technology is applied, and performs a process related to each frame image of the moving image (input image) to be projected. The central processing unit 111 has, for example, an image processor 121 and a distributor 122. The image processor 121 is an embodiment of the image processor to which the present technology is applied, and performs a process related to an image process with respect to the each frame image of the moving image (input image) to be projected. The distributor 122 performs a process related to the distribution of each frame image of the moving image (input image) to be projected.

The projection devices 112-1 to 112-4 are each a device having a function of projecting an image, and performs a process related to projecting an image. It is to be noted that, in a case where it is not necessary that the projection devices 112-1 to 112-4 be described separately from each other, they are each referred to as projection device 112. The projection device 112 projects images at a frame rate of, for example, 30 frames per second.

The input image entered into the image projection system 100 is a moving image having a frame rate of 120 frames per second. The input image is inputted to (image processor 121 of) the central processing unit 111. On the basis of each frame image of the input image, the image processor 121 performs the image process for controlling the time during which the projection image, which is each frame image of the input image projected on the screen 113, is viewable by the user. The detail of the image process will be described later. The image processor 121 provides each frame image to the distributor 122 at a frame rate of 120 frames per second.

The distributor 122 sequentially distributes the supplied frame images to the projection devices 112-1 to 112-4 cyclically. For example, the distributor 122 distributes the frame images of frame numbers 1, 5, 9, . . . to the projection device 112-1, distributes the frame images of frame numbers 2, 6, 10, . . . to the projection device 112-2, distributes the frame images of frame numbers 3, 7, 11, . . . to the projection device 112-3, and distributes the frame images of frame numbers 4, 8, 12, . . . to the projection device 112-4.

Each projection device 112 sequentially outputs the frame images distributed to itself as output images, and projects the output images to the same position of the screen 113. As described above, one frame is distributed to each projection device 112 every four frames of the moving image where the frame rate is 120 frames per second. That is, each projection device 112 is supplied with a frame image at a frame rate of 30 frames per second. Thus, it is possible that each projection device 112 that is able to project images at a frame rate of 30 frames per second projects the supplied frame images sequentially. That is, the image projection system 100 is able to project, by using the projection device 112 that projects images at a frame rate lower than the frame rate of the input image, the input image at the frame rate of the input image. In other words, the image projection system 100 is able to project the input image having a higher rate than the frame rate of the image projection of the projection device 112 at the frame rate of the input image.

In addition, the distributor 122 sequentially distributes the frame images of the moving image of 120 frames per second, and thus, the timing at which a frame image is distributed to each projection device 112 is shifted by $\frac{1}{120}$. Therefore, the timings at which the output images of the respective projection device 112 are projected are also each shifted by $\frac{1}{120}$ second. It is thus possible for the image projection system 100 to project images at a frame rate of 120 frames per second, similar to the case of the image projection system 10 of FIG. 1.

[Image Processor]

Figure 6:
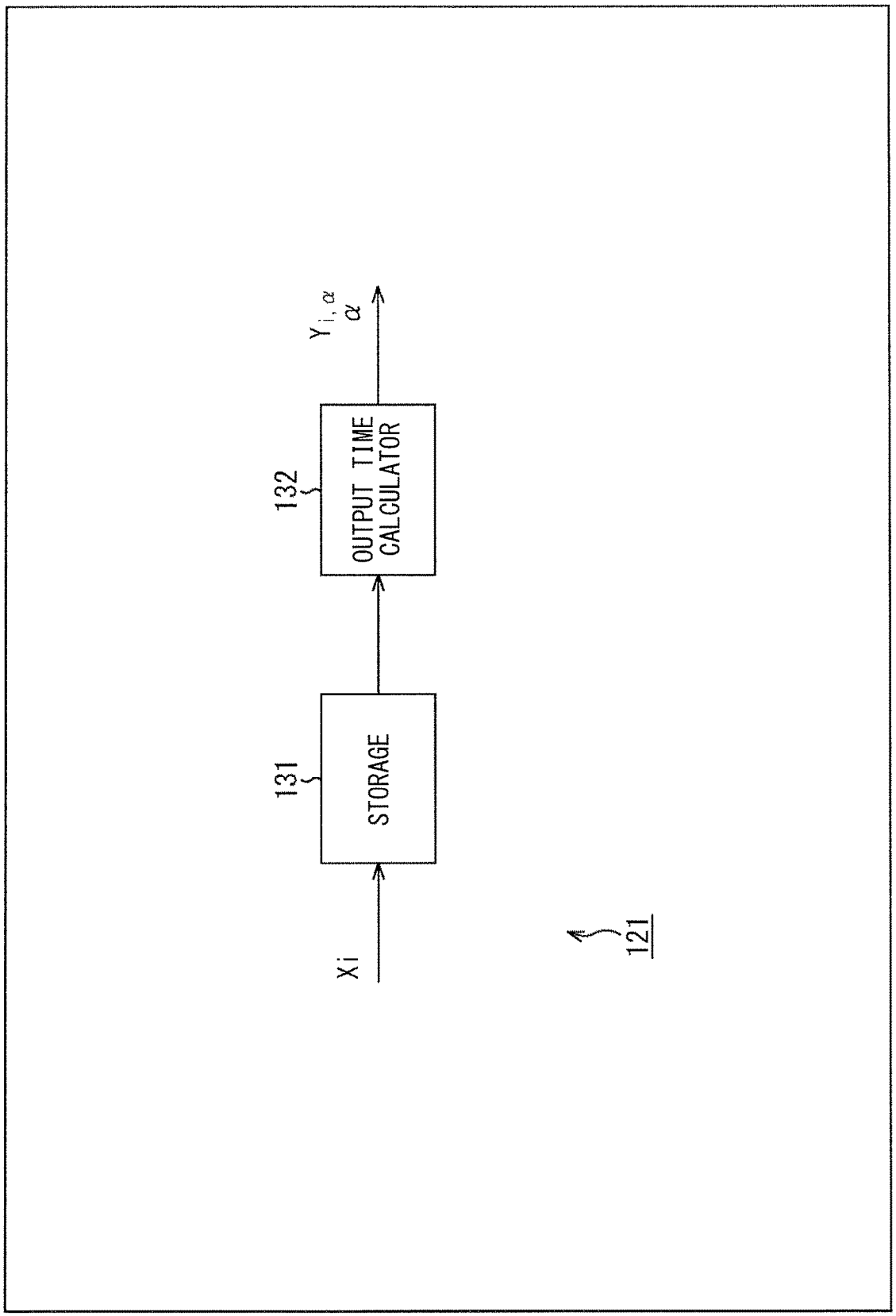
FIG. 6 is a block diagram illustrating a main configuration example of an image processor.

FIG. 6 is a block diagram illustrating a main configuration example of the image processor 121. As illustrated in FIG. 6, the image processor 121 includes a storage 131 and an output time calculator 132. The storage 131 stores an input image. The storage 131 supplies the stored input image to the output time calculator 132 at a predetermined timing or on the basis of an external request from the output time calculator 132 or the like.

The output time calculator 132 acquires each frame image of the input image from the storage 131, and, one the basis of each frame image, controls the time (also referred to as output time) in which each frame image is outputted from the projection device 112.

For short time such as a frame rate, in general, the shorter the output time of the frame image, the darker the projection image (the luminance decreases). In other words, the difference between the luminance of the input image and the luminance of the projection image increases with a decrease in the time during which the projection image is viewable by the user. Therefore, as denoted by a straight line 151 of FIG. 7, the shorter the output time, the greater the error of projection image to the input image (in this case, a luminance difference between the projection image and the input image).

In general, the longer the output time of the frame image, the longer a projection image of an attentional frame image is superimposed on (overlaps with) a projection image of another frame image (in some cases, the greater the number of frame images that are superimposed upon each other). When (the projection images of) the frame images differing in time points are superimposed upon each other, a so-called superimposition blur occurs as described referring to B of FIG. 3. In other words, the difference between the projection image and the input image caused by the superimposition of the projection images of the frame images increases as the time during which the projection image is viewable by the user increases. Therefore, as illustrated in a curve 152 of the graph of FIG. 7, in a case where the output time of each frame image is longer as the projection images of the frame images are superimposed upon each other, the error (superimposition blur in this case) with respect to the input image of the projection image becomes larger as the output time becomes longer.

Figure 7:
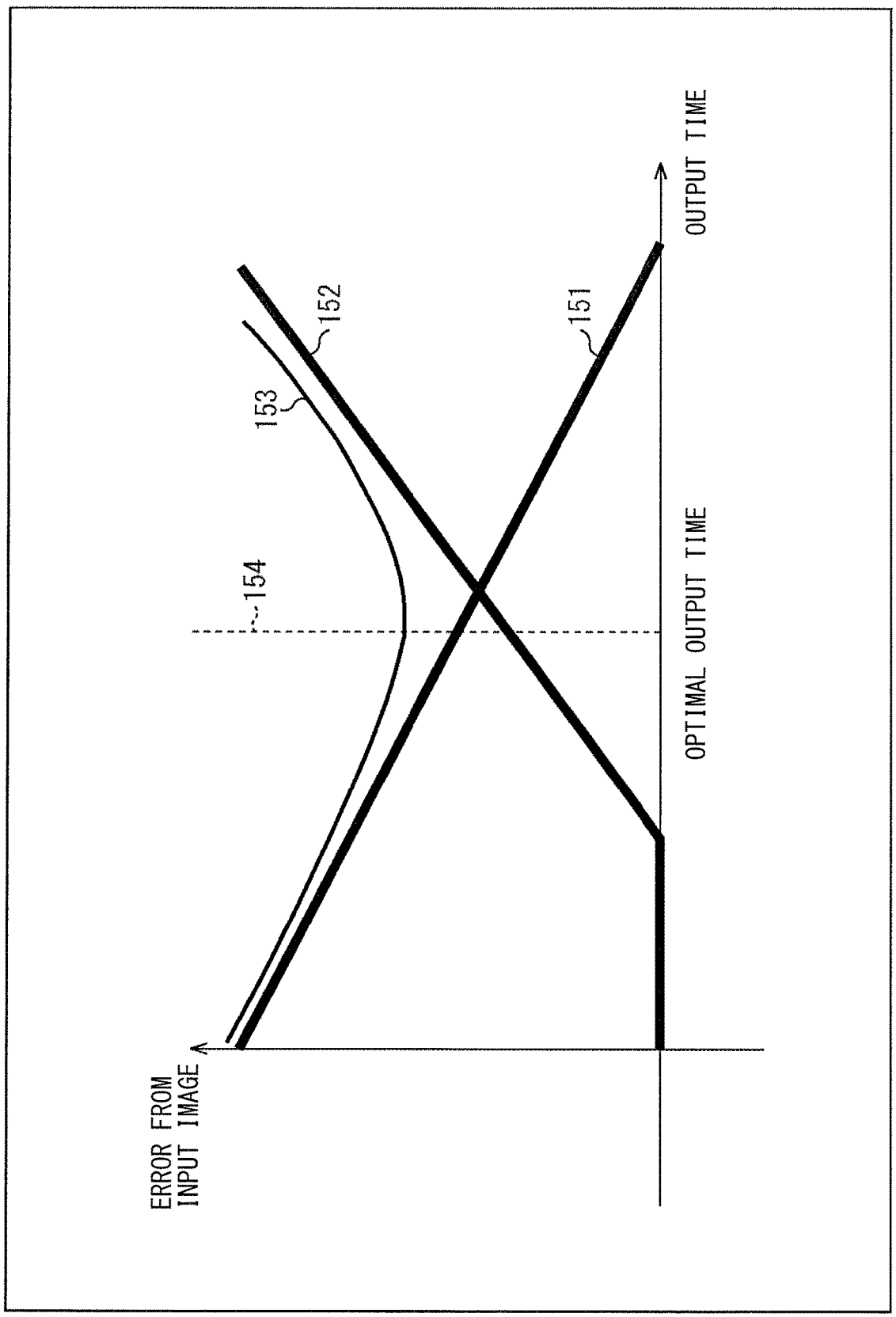
FIG. 7 is a diagram for explaining an example of a state of a control on an output time.

As illustrated in the graph of FIG. 7, the overall error considering both the above-mentioned error due to constraint of the expressible luminance values (the error due to the luminance reduction) and the error due to the afterimage deterioration (the error due to the superimposition blur) is a curve like a curve 153, for example, from the states of increase and decrease of the straight line 151 and the curve 152. In other words, by controlling the output time of each frame image, the output time calculator 132 is able to control the magnitude of the overall error (the difference between the input image and the projection image due to the reduction in the luminance, and the difference between the input image and the projection image, which increases due to the increase in the time during which the projection image is viewable by the user).

For example, it is assumed that the input image is 120 frames per second (120 Hz) and the projection devices 112-1 to 112-4 respectively output the output images at 30 frames per second (30 Hz). It is also assumed that the maximum value of the output time of each frame image is the time of one frame at the frame rate (in this case, ⅓₀ second (about 33.3 ms)), and that the parameter α is a parameter representing the output time as a percentage (%) of the maximum value.

Figure 8:
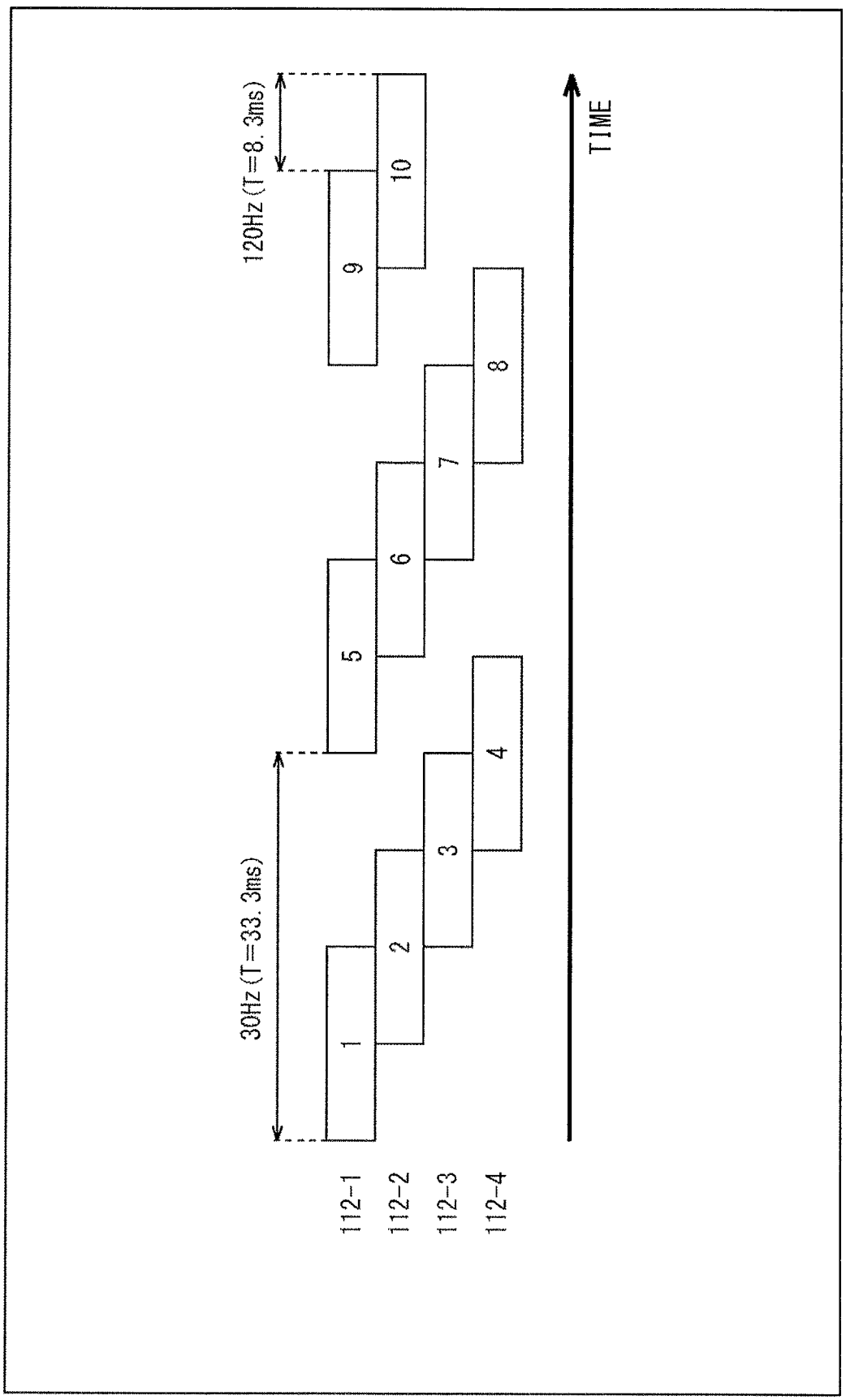
FIG. 8 is a diagram for explaining an example of a state of an image projection in which the output time is controlled.

When α=50%, the projection devices 112-1 to 112-4 respectively output the respective frame images as illustrated in FIG. 8. Each rectangle illustrated in FIG. 8 indicates a period during which each projection device 112 is outputting an output image, and a number indicates a frame number of the output image. In this case, the frame images are superimposed (overlapped) by ¹⁄₁₂₀ second (about 8.3 ms) on the previous and the next frame images.

Thus, the output time calculator 132 (the image processor 121) is able to control the output time of each frame image by determining the parameter α representing the output time of the frame image and supplying the parameter α to each projection device 112. As the output time of each frame image changes, the time during which the projection image of each frame image is viewable by the user changes. In other words, the output time calculator 132 (the image processor 121) is able to control the time during which the projection image of each frame image is viewable by the user on the basis of each frame image of the input image.

As described above, by controlling "the output time of each frame image" as "the time during which the projection image of each frame image is viewable by the user", it is possible to control the magnitude of the overall error of the error due to the luminance reduction and the error due to the superimposition blur. Therefore, the output time calculator 132 is able to suppress the reduction in the subjective image quality of the projection image by such control.

For example, the parameter α may be determined so that the output time calculator 132 suppresses the overall error (i.e., reduces the magnitude of the overall error) of the error due to the luminance reduction (the difference between the projection image and the input image due to the luminance reduction) and the error due to the superimposition blur (the difference between the projection image and the input image in the state in which the plurality of (projection images of) frame images are superimposed upon each other). By doing so, the output time calculator 132 is able to suppress the reduction in the subjective image quality of the projection image.

For example, the output time calculator 132 may determine the parameter α such that the overall error of the error due to the luminance reduction and the error due to the superimposition blur is minimized. For example, the output time calculator 132 may determine an optimal output time (dotted line 154), which is the output time at which the minimum value of the curve 153 is obtained in the graph of FIG. 7, and supply the parameter α representing the optimal output time to each projection device 112. By doing so, the output time calculator 132 is able to further suppress the reduction in the subjective image quality of the projection image.

Figure 9:
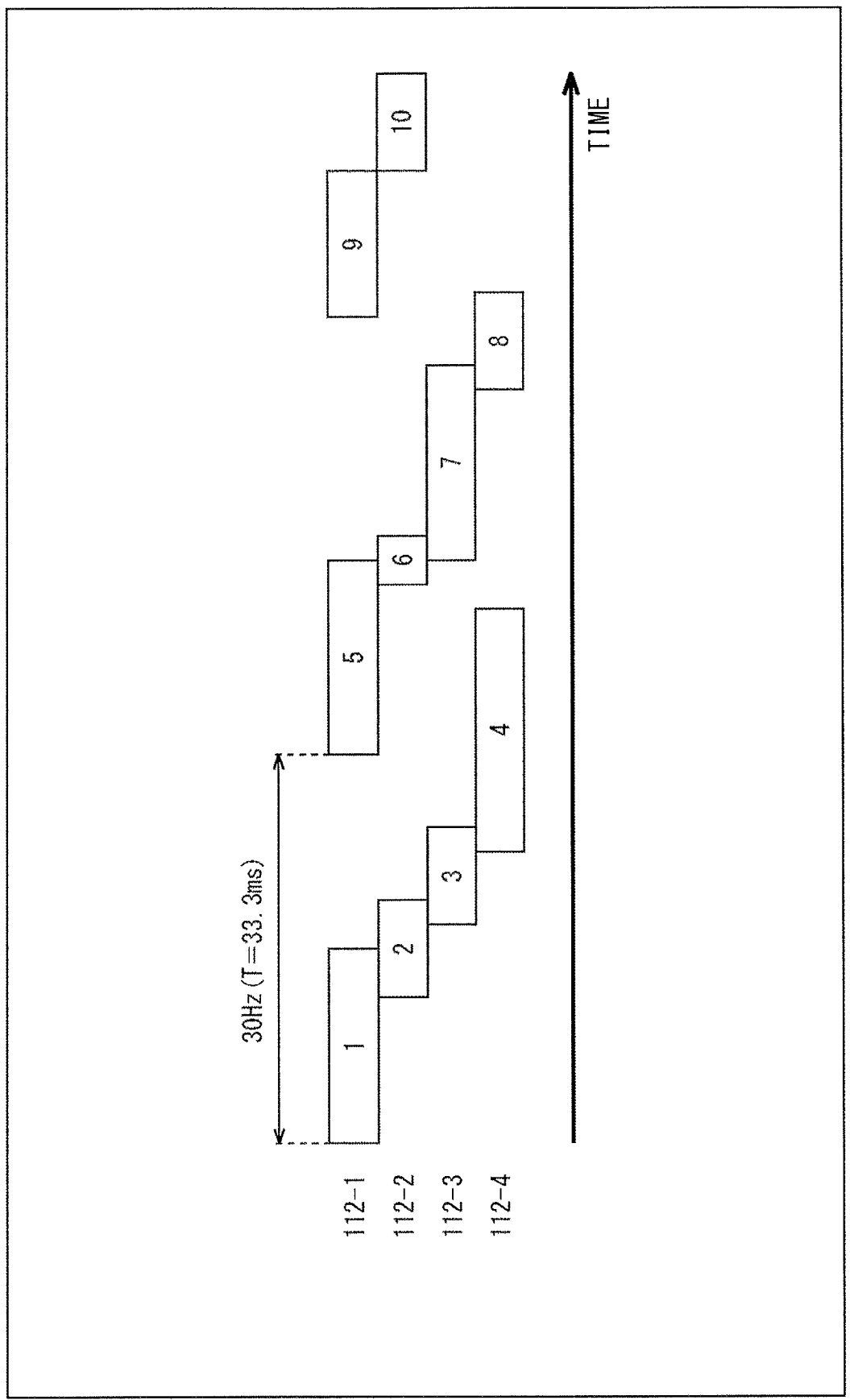
FIG. 9 is a diagram for explaining an example of a state of an image projection in which the output time is controlled.

It is to be noted that the output time calculator 132 may determine the parameter α for each frame image. For example, as in the example illustrated in FIG. 9, it is not necessary that all the frame images have the same output time. In other words, the output time calculator 132 may control the time during which the projection image is viewable by the user for each frame image of the input image.

In general, the error due to the luminance reduction and the error due to the superimposition blur change depending on the contents of the images. Therefore, by the output time calculator 132 determining the parameter α for each frame image according to the content of each frame image, it is possible to further suppress the overall error. That is, the output time calculator 132 is able to further suppress the reduction in the subjective image quality of the projection image.

[Method 1 of Determining Parameter α]

Next, a method of determining the parameter α indicating the above-mentioned output time will be described. As described above, the parameter α represents the output time of the frame image as a percentage (%) of the maximum value of the output time (e.g., the time of one frame at the frame rate).

By the filtering operation (coefficient $D_{i,\alpha}$), it is possible to estimate a pixel value (output pixel value) $Y_{i,\alpha}$ of the output image outputted from the projection device 112 by using a pixel value (input pixel value) $X_i$ of the input image as in the following equation (1). Where k is a parameter indicating a peripheral tap loop of the filter.

$$Y_{i,\alpha} = \sum_{k=-m}^{m} D_{k,\alpha} \cdot X_{i+k}. \tag{1}$$

It is to be noted that, assuming the pixel value is a luminance value, the input pixel value $X_i$ is also referred to as input luminance value $X_i$. Further, the output pixel value $Y_{i,\alpha}$ is also referred to as output luminance value $Y_{i,\alpha}$. In addition, in a case where the input pixel value $X_i$ is outputted as it is, it is possible that the output pixel value $Y_{i,\alpha}$ be estimated as in the following equation (2).

$$Y_{i,\alpha} = X_i \tag{2}$$

In response to the reduction in the output time (parameter α), a constraint is applied to the output pixel value as in the following equation (3). The maximum output pixel value (maximum output luminance) in a case where the output time does not reduce (i.e., in a case where the parameter α=100%) is $Y_{max}$. In equation (3), CLIP(x, L, H) represents a function for clipping x between a minimum value L and a maximum value H.

$$Y_{i,\alpha}' = CLIP(Y_{i,\alpha}, 0, \alpha \cdot Y_{max}) \tag{3}$$

It is possible to estimate the pixel value (projection pixel value) $Z_{i,\alpha}$ of the projection image projected on the screen 113 as in the following equation (4) by using a blur coefficient $B_{j,\alpha}$ due to overlapping. It is to be noted that, in equation (4), j represents a parameter that identifies the projection device 112.

$$Z_{i,\alpha} = \sum_{j=0}^{3} B_{j,\alpha} \cdot Y_{i,\alpha}'. \tag{4}$$

Assuming that the pixel value is a luminance value, the projection pixel value $Z_{i,\alpha}$ is also referred to as projection luminance value $Z_{i,\alpha}$. Since the number of projection devices 112 that the image projection system 100 includes is four, an ideal value of the projection pixel value $Z_{i,\alpha}$ is four times the input pixel value $X_i$ (i.e., $4X_i$), assuming that the luminance values of the respective frame images are the same. Therefore, it is possible to determine the error $e_{i,\alpha}$ for each pixel (difference between the input image and the projection image for each pixel) by the following equation (5).

$$e_{i,\alpha} = 4X_i - Z_{i,\alpha} \tag{5}$$

By totalizing the values within one screen (the entire frame image), it is possible to determine an error $E_{i,\alpha}$ of the entire frame image as in the following equation (6).

$$E_{i,\alpha} = \Sigma e_{i,\alpha}^2 \tag{6}$$

In equation (6), the error $E_{i,\alpha}$ (also referred to as in-plane sum $E_{i,\alpha}$) of the entire frame image is determined as the sum of squared errors; however, the calculation method of the error $E_{i,\alpha}$ of the entire frame image is optional and is not limited to this example. For example, the sum of the errors to the power of one may be the error $E_{i,\alpha}$ of the entire frame image, or the largest error may be selected and set to the error $E_{i,\alpha}$ of the entire frame image.

That is, it is possible to express the error $E_{i,\alpha}$ of the entire frame image as a function of the parameter $\alpha$. It is thus possible for the output time calculator 132 to set the error $E_{i,\alpha}$ of the entire frame image by setting output time, i.e., the parameter $\alpha$. In other words, it is possible to control the output time calculator 132 so as to suppress the reduction in the subjective image quality of the projection image by setting the parameter $\alpha$.

Therefore, for example, the output time calculator 132 is able to suppress the reduction in the subjective image quality of the projection image, by setting the output time (parameter $\alpha$) so as to suppress an increase in the error $E_{i,\alpha}$ of the entire frame image. In addition, for example, the output time calculator 132 is able to further suppress the reduction in the subjective image quality of the projection image, by setting the output time (parameter $\alpha$) (i.e., determining the optimal output time) so that the error $E_i$, of the entire frame image are minimized.

[Flow of Image Display Process]

Next, a flow of a process executed in the image projection system 100 will be described. The image projection system 100 performs an image display process when projecting a high frame rate moving image as described above. Referring to a flowchart of FIG. 10, an exemplary flow of the image display process will be described.

When the image display process is started, the image processor 121 performs an image process for controlling the output time on the basis of the input image having a frame rate of 120 frames per second in step S101.

In step S102, the distributor 122 distributes each frame image of the input image to each projection device 112. The distributor 122 distributes the parameter $\alpha$ calculated in step S101 to each projection device 112.

In step S103, each projection device 112 outputs (projects) each frame image distributed to itself in the output time corresponding to the parameter $\alpha$ distributed to itself. In this manner, the frame images are sequentially projected.

When the projection of the images is finished, the image display process ends.

[Flow of Image Process]

Next, referring to a flowchart of FIG. 11, an exemplary flow of the image process executed in step S101 of FIG. 10 will be described.

When the image process is started, the storage 131 of the image processor 121 stores all frame images of the input image in step S111.

In step S112, the output time calculator 132 determines the output time of each frame image on the basis of each frame image of the input image stored in the storage 131. For example, the output time calculator 132 determines the parameter $\alpha$ representing the output time.

Figure 10:
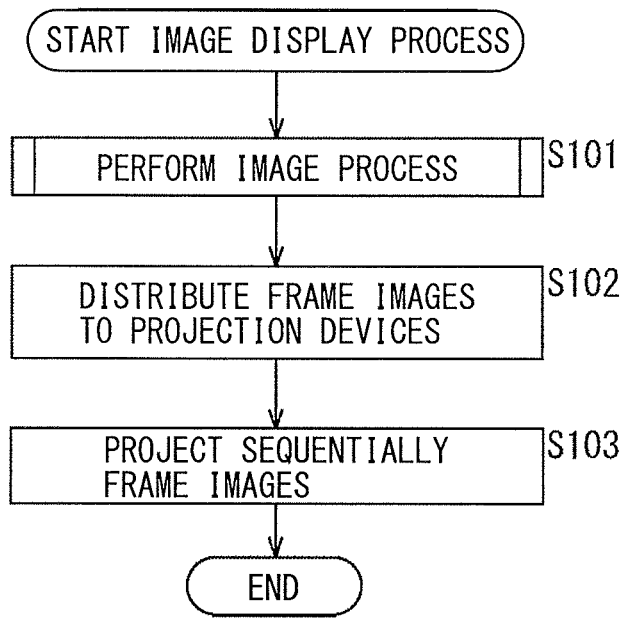
FIG. 10 is a flowchart for explaining an example of a flow of an image display process.

When the output time (parameter $\alpha$) is determined, the image process ends, and the process returns to FIG. 10.

[Flow of Output Time Calculation Process]

Next, referring to a flowchart of FIG. 12, an exemplary flow of the output image calculation process executed in step S112 of FIG. 11 will be described.

When the output time calculation process is started, the output time calculator 132 sets, in step S121, an attentional horizontal coordinate, which is a horizontal coordinate to be processed, from the unprocessed horizontal coordinates of the frame image of the input image.

In step S122, the output time calculator 132 sets an attentional vertical coordinate, which is a vertical coordinate to be processed, from the unprocessed vertical coordinates of the frame image of the input image.

In step S123, the output time calculator 132 sets the peripheral tap loop k (k=−m to m).

In step S124, the output time calculator 132 reads the input pixel value Xi+k from the storage 131.

In step S125, the output time calculator 132 calculates the output pixel value $Y_{i,\alpha}$ by the predictive calculation represented by the above equation (1) (or equation (2)).

In step S126, the output time calculator 132 reflects the constraint of the maximal luminance due to the output time control to the output pixel value $Y_{i,\alpha}$ by the above equation (3).

In step S127, the output time calculator 132 calculates the projection pixel value $Z_{i,\alpha}$ to which the constraint of the luminance value is reflected by the above equation (4).

In step S128, the output time calculator 132 calculates the error $e_{i,\alpha}$ between the input pixel value $X_i$ and the projection pixel value $Z_{i,\alpha}$.

In step S129, the output time calculator 132 determines whether or not all the peripheral tap loops k have been processed. If it is determined that there is an unprocessed peripheral tap loop k, the process returns to step S123, and the subsequent steps are repeated. That is, steps S123 to S129 are repeated for each peripheral tap loop k. If it is determined in step S129 that the process has been performed for all the peripheral tap loops k, the process proceeds to step S130.

In step S130, the output time calculator 132 determines whether or not all the vertical coordinates have been processed. If it is determined that there is an unprocessed vertical coordinate, the process returns to step S122, and the subsequent steps are repeated. That is, steps S122 to S130 are repeated for each vertical coordinate. If it is determined in step S130 that the process has been performed for all the vertical coordinates, the process proceeds to step S131.

In step S131, the output time calculator 132 determines whether or not all the horizontal coordinates have been processed. If it is determined that there is an unprocessed horizontal coordinate, the process returns to step S121, and the subsequent steps are repeated. That is, steps S121 to step S131 are repeated for each horizontal coordinate. If it is determined in step S131 that the process has been performed for all the horizontal coordinates, the process proceeds to step S132.

In step S132, the output time calculator 132 calculates the in-plane sum $E_{i,\alpha}$ of the errors $e_{i,\alpha}$ for the respective pixels calculated in step S128.

In step S133, the output time calculator 132 determines the optimal output time (the parameter α) at which the in-plane sum $E_{i,\alpha}$ calculated in step S132 is the minimum.

Figure 11:
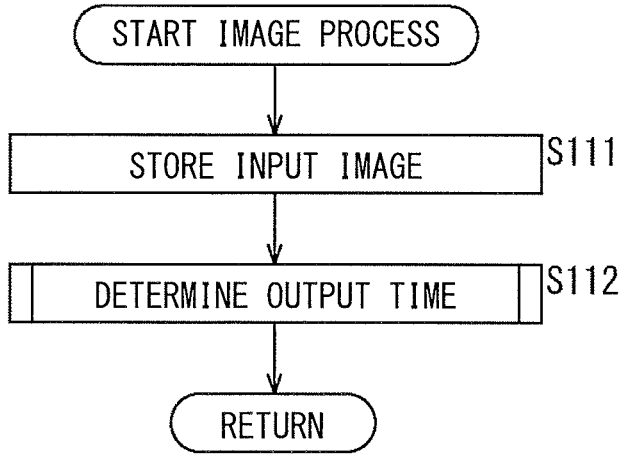
FIG. 11 is a flowchart for explaining an example of a flow of an image process.

When step S133 ends, the output time calculation process ends and the process returns to FIG. 11.

By performing each step as described above, the output time calculator 132 (image processor 121) is able to control the output time of each frame image so that the error between the input image and the projection image is minimized. Therefore, the image projection system 100 is able to suppress the reduction in the subjective image quality due to the occurrence of the superimposition blur and the reduction in the luminance in the projection image.

It is to be noted that, by performing image projection as described above, the image projection system 100 is able to project a high frame rate image using a low frame rate projection device 112. Therefore, it is possible to achieve high frame rate projection more inexpensively. Further, as described above, the image projection system 100 is able to suppress the reduction in the subjective image quality only by converting image signals by the image processor 121 without necessitating special viewing devices such as glasses. That is, the image projection system 100 is able to more easily and inexpensively suppress the reduction in the subjective image quality. In addition, the image projection system 100 is able to achieve even higher frame rate image projection by increasing the number of projection devices 112.

In the above description, the difference (error) between the input image and the projection image is determined for all the pixels of the frame image, but the difference is not limited thereto, and the error may be calculated for some pixels and the in-plane sum of the error may be determined using the errors of the some pixels.

[Method 2 of Determining Parameter α]

The method of determining the parameter α indicating the output time is optional and is not limited to the above-mentioned examples. Another example of the method of determining the parameter α will be described below. As described above, the parameter α represents the output time of the frame image as a percentage (%) of the maximum value of the output time (e.g., the time of one frame at the frame rate).

It is possible to estimate an error $e_{clip, i, \alpha}$ (first difference) due to the luminance reduction by restricting the input pixel value Xi in accordance with the decrease (parameter α) of the output time as in the following equation (7). That is, it is possible to estimate the first difference on the basis of the length of the time during which the projection image is viewable by the user. For example, the first difference may be estimated on the basis of a ratio of the time during which the projection image is viewable by the user to the maximum value (the ratio to a case where the time during which the projection image is viewable by the user is the maximum).

$$e_{clip,i,\alpha} = X_i - \text{CLIP}(X_i, 0, \alpha \cdot Y_{max}) \tag{7}$$

Further, since the superimposition blur is more likely to occur at a place where the luminance change is larger, it is possible to estimate an error $e_{deblur, i, \alpha}$ (second difference) due to the superimposition blur as in the following equation (8) using the sum of the difference values from the neighboring pixels as a characteristic quantity. That is, it is possible to estimate the second difference on the basis of the difference between an attentional pixel and a peripheral pixel.

$$e_{deblur,i,\alpha} = \sum_k |X_i - X_{i+k}| \tag{8}$$

Therefore, it is possible to determine the error $E_{i,\alpha}$ of the entire frame image (the sum of the entire image of the first difference and the second difference) as in the following equation (9).

$$E_{i,\alpha} = \Sigma e_{clip,i,\alpha}^2 + \Sigma e_{deblur,i,\alpha}^2 \tag{9}$$

That is, it is possible to express the error $E_{i,\alpha}$ of the entire frame image as a function of the parameter α. It is thus possible for the output time calculator 132 to set the error $E_{i,\alpha}$ of the entire frame image by setting output time, i.e., the parameter α. In other words, it is possible to control the output time calculator 132 so as to suppress the reduction in the subjective image quality of the projection image by setting the parameter α.

Therefore, for example, the output time calculator 132 is able to suppress the reduction in the subjective image quality of the projection image, by setting the output time (parameter α) so as to suppress an increase in the error $E_{i,\alpha}$ of the entire frame image. In addition, for example, the output time calculator 132 is able to further suppress the reduction in the subjective image quality of the projection image, by setting the output time (parameter α) (i.e., determining the optimal output time) so that the error $E_i$, of the entire frame image are minimized.

[Flow of Output Time Calculation Process]

Also in this case, the image display process is performed in the similar flow to the case described referring to the flowchart of FIG. 10. The image process executed in step S101 of the image display process is also performed in the same flow as that described referring to the flowchart of FIG. 11.

Figure 13:
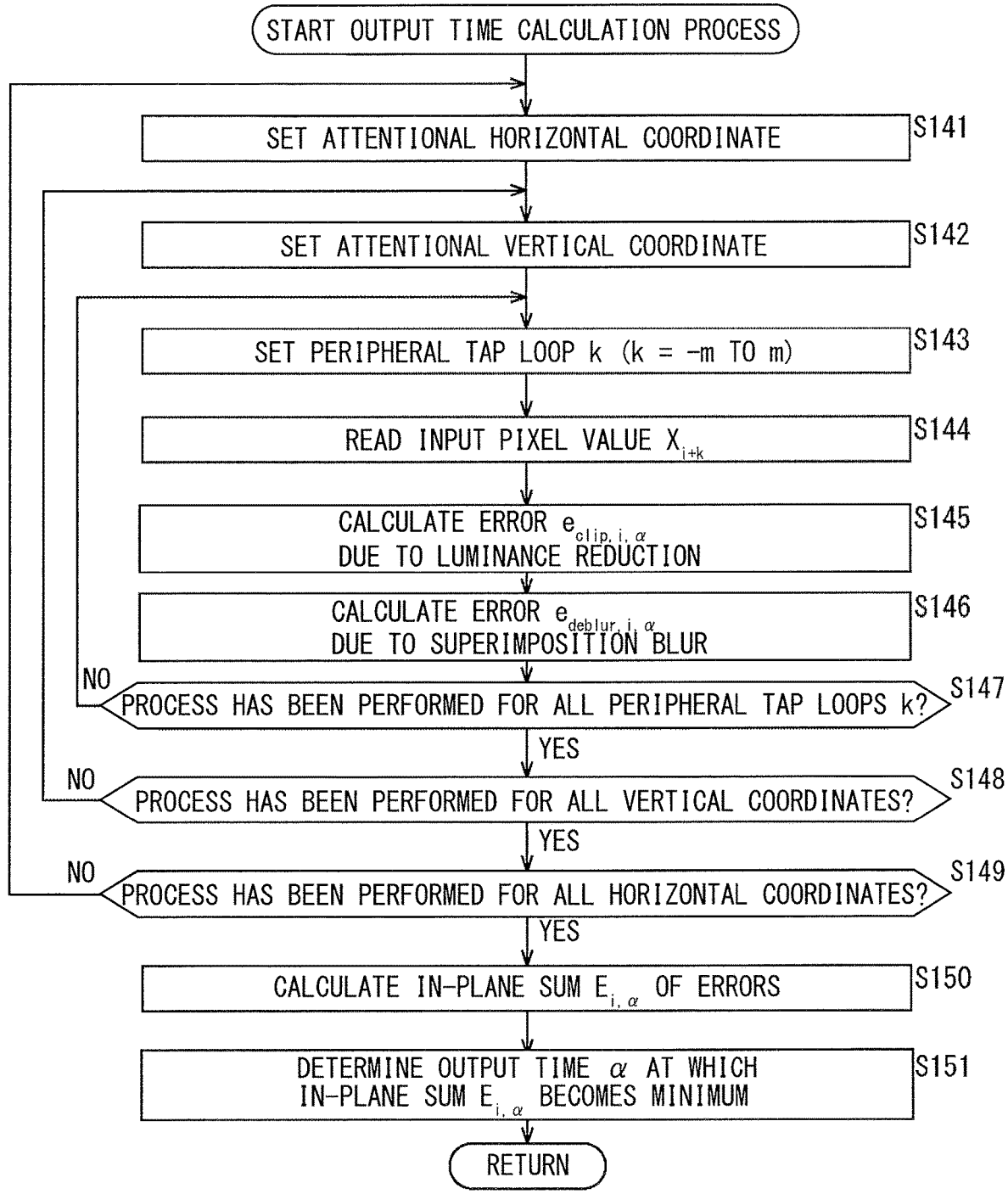
FIG. 13 is a flowchart for explaining an example of a flow of an output time calculation process.

Further, referring to a flowchart of FIG. 13 an exemplary flow of the output image calculation process in this case executed in step S112 of FIG. 11 will be described.

Also in this case, when the output time calculation process is started, the output time calculator 132 sets, in step S141, an attentional horizontal coordinate, which is a horizontal coordinate to be processed, from the unprocessed horizontal coordinates of the frame image of the input image.

In step S142, the output time calculator 132 sets an attentional vertical coordinate, which is a vertical coordinate to be processed, from the unprocessed vertical coordinates of the frame image of the input image.

In step S143, the output time calculator 132 sets the peripheral tap loop k (k=−m to m).

In step S144, the output time calculator 132 reads the input pixel value $X_{i+k}$ from the storage 131.

In step S145, the output time calculator 132 calculates the error $e_{clip, i, \alpha}$ due to the luminance reduction, as indicated in the above equation (7).

In step S146, the output time calculator 132 calculates the error $e_{deblur, i, \alpha}$ due to the superimposition blur, as indicated in the above equation (8).

In step S147, the output time calculator 132 determines whether or not all the peripheral tap loops k have been processed. If it is determined that there is an unprocessed peripheral tap loop k, the process returns to step S143, and the subsequent steps are repeated. That is, steps S143 to S147 are repeated for each peripheral tap loop k. If it is determined in step S147 that the process has been performed for all the peripheral tap loops k, the process proceeds to step S148.

In step S148, the output time calculator 132 determines whether or not all the vertical coordinates have been processed. If it is determined that there is an unprocessed vertical coordinate, the process returns to step S142, and the subsequent steps are repeated. That is, steps S142 to S148 are repeated for each vertical coordinate. If it is determined in step S148 that the process has been performed for all the vertical coordinates, the process proceeds to step S149.

In step S149, the output time calculator 132 determines whether or not all the horizontal coordinates have been processed. If it is determined that there is an unprocessed horizontal coordinate, the process returns to step S141, and the subsequent steps are repeated. That is, steps S141 to step S149 are repeated for each horizontal coordinate. If it is determined in step S149 that the process has been performed for all the horizontal coordinates, the process proceeds to step S150.

In step S150, the output time calculator 132 calculates the in-plane sum $E_{i,\alpha}$ of the errors $e_{clip,i,\alpha}$ due to the luminance reduction for each pixel calculated in step S145 and the errors $e_{deblur,i,\alpha}$ due to the superimposition blur calculated in step S146, as indicated in the above equation (9).

In step S151, the output time calculator 132 determines the optimal output time (the parameter $\alpha$) at which the in-plane sum $E_{i,\alpha}$ calculated in step S150 is the minimum.

When step S151 ends, the output time calculation process ends and the process returns to FIG. 11.

By performing each step as described above, the output time calculator 132 (image processor 121) is, also in this case, able to control the output time of each frame image so that the error between the input image and the projection image is minimized. Therefore, the image projection system 100 is able to suppress the reduction in the subjective image quality due to the occurrence of the superimposition blur and the reduction in the luminance in the projection image.

By performing image projection as described above, the image projection system 100 is able to project a high frame rate image using a low frame rate projection device 112. Therefore, it is possible to achieve high frame rate projection more inexpensively. Further, as described above, the image projection system 100 is able to suppress the reduction in the subjective image quality only by converting image signals by the image processor 121 without necessitating special viewing devices such as glasses. That is, the image projection system 100 is able to more easily and inexpensively suppress the reduction in the subjective image quality. In addition, the image projection system 100 is able to achieve even higher frame rate image projection by increasing the number of projection devices 112.

In the above description, the difference (error) between the input image and the projection image is determined for all the pixels of the frame image, but the difference is not limited thereto, and the error may be calculated for some pixels and the in-plane sum of the error may be determined using the errors of the some pixels.

In the above description, the filtering operation is used when estimating the output pixel value $Y_{i,\alpha}$ and the projection pixel value $Z_{i,\alpha}$, but the estimation method is optional and is not limited to the filtering operation. For example, other methods may be used, such as optimization by linear programming.

3. Second Embodiment

[Image Projection System]

Although the first embodiment has been described so as to control the output time of the frame image, the present disclosure is not limited to this example, and, for example, the image processor 121 may further perform, with respect to each frame image before being projected, an image process that suppresses an influence caused by superimposing a plurality of frame images in the projection image of each frame image of the input image.

More specifically, for example, the image processor 121 may perform the image process that corrects the pixel value (luminance value) of each frame image in accordance with the superimposition of the projection image (a plurality of frame images). For example, the image processor 121 may correct the pixel value such that the error between input image and the projection image is minimized.

Even when the image processor 121 corrects the pixel value (luminance value) of each frame image of the input image in accordance with the superposition of the projection image, it is possible to reduce the error to some extent, but the correction performance is limited by a model deviation or the like caused by the synchronization deviation of the projection devices 112. Therefore, as in the case of the curve 152 of the graph of FIG. 7, when the limit is exceeded, the correction error (correction error due to the afterimage deterioration) increases with an increase in of the output time.

Accordingly, similarly to the first embodiment, the image projection system 100 is able to suppress the increase in the overall error of the error due to the luminance reduction and the correction error due to the afterimage deterioration by controlling the output time of each frame image (controlling the time during which the projection image of each frame image of the input image is viewable by the user). Therefore, the image projection system 100 is able to suppress the reduction in the subjective image quality of the projection image.

Also in such a case, the image projection system 100 basically has the similar configuration as the case of the first embodiment (FIG. 5).

[Image Processor]

Figure 14:
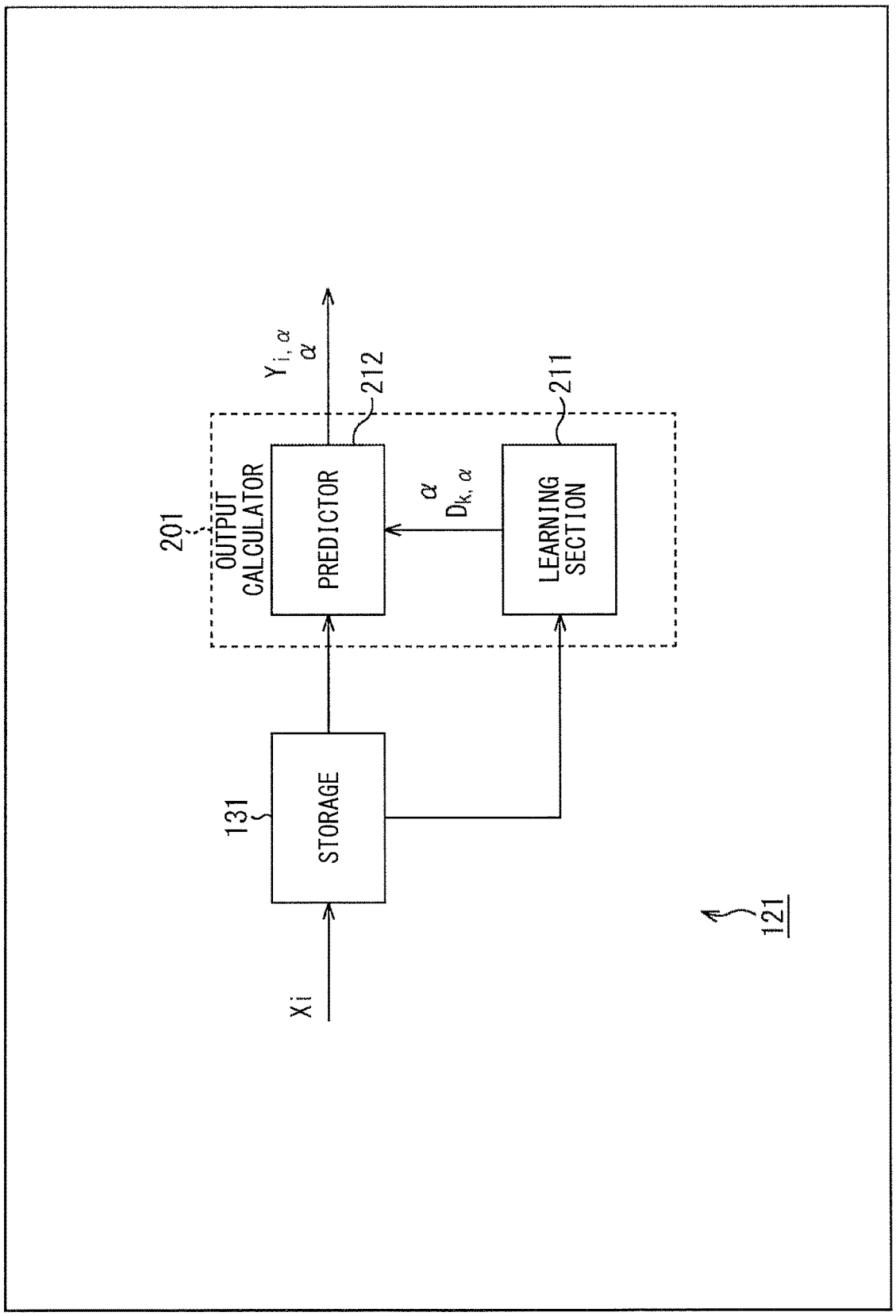
FIG. 14 is a block diagram illustrating a main configuration example of an image processor.

In this case, however, the image processor 121 includes, as illustrated in FIG. 14, a storage 131 and an output calculator 201.

The output calculator 201 determines information related to the output time of each frame image (e.g., parameter $\alpha$) and the output pixel value $Y_{i,\alpha}$ on the basis of each frame image of the input image, and supplies the information and the output pixel value $Y_{i,\alpha}$ to each projection device 112, thereby controlling the output time of each frame image and the output luminance value of each pixel. For example, as illustrated in FIG. 14, the output calculator 201 includes a learning section 211 and a predictor 212.

Similarly with the case of the first embodiment, the storage 131 stores all frame images of the moving image to be inputted. The storage 131 supplies the stored input image to the learning section 211 and the predictor 212 at a predetermined timing or on the basis of an external request from the learning section 211, the predictor 212, or the like.

The learning section 211 performs a process related to a learning process for optimizing a filter. For example, the learning section 211 sets the output time (parameter $\alpha$) as described in the first embodiment.

Figure 15:
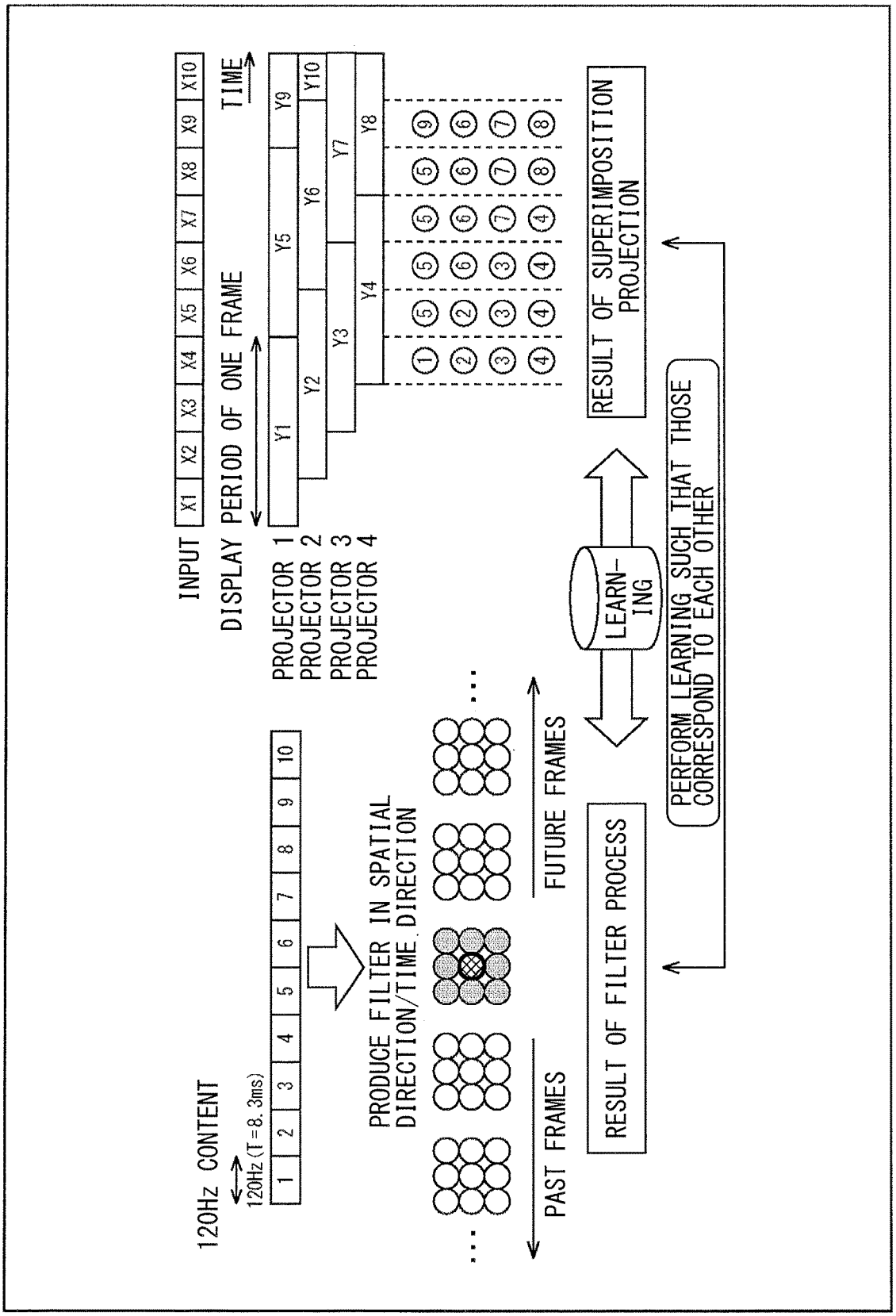
FIG. 15 is a diagram for explaining an example of a state of an image projection.

Further, as illustrated in FIG. 15, the learning section 211 forms a filter in a spatial direction and a time direction using a predetermined moving image prepared in advance as a learning sample, and filters the learning sample using the filter. Thereafter, the learning section 211 performs the learning process so that the filtering result coincides with the projection image, and calculates a filter coefficient $D_{k,\alpha}$ corresponding to the parameter α.

[Method 3 of Determining Parameter α]

Figure 16:
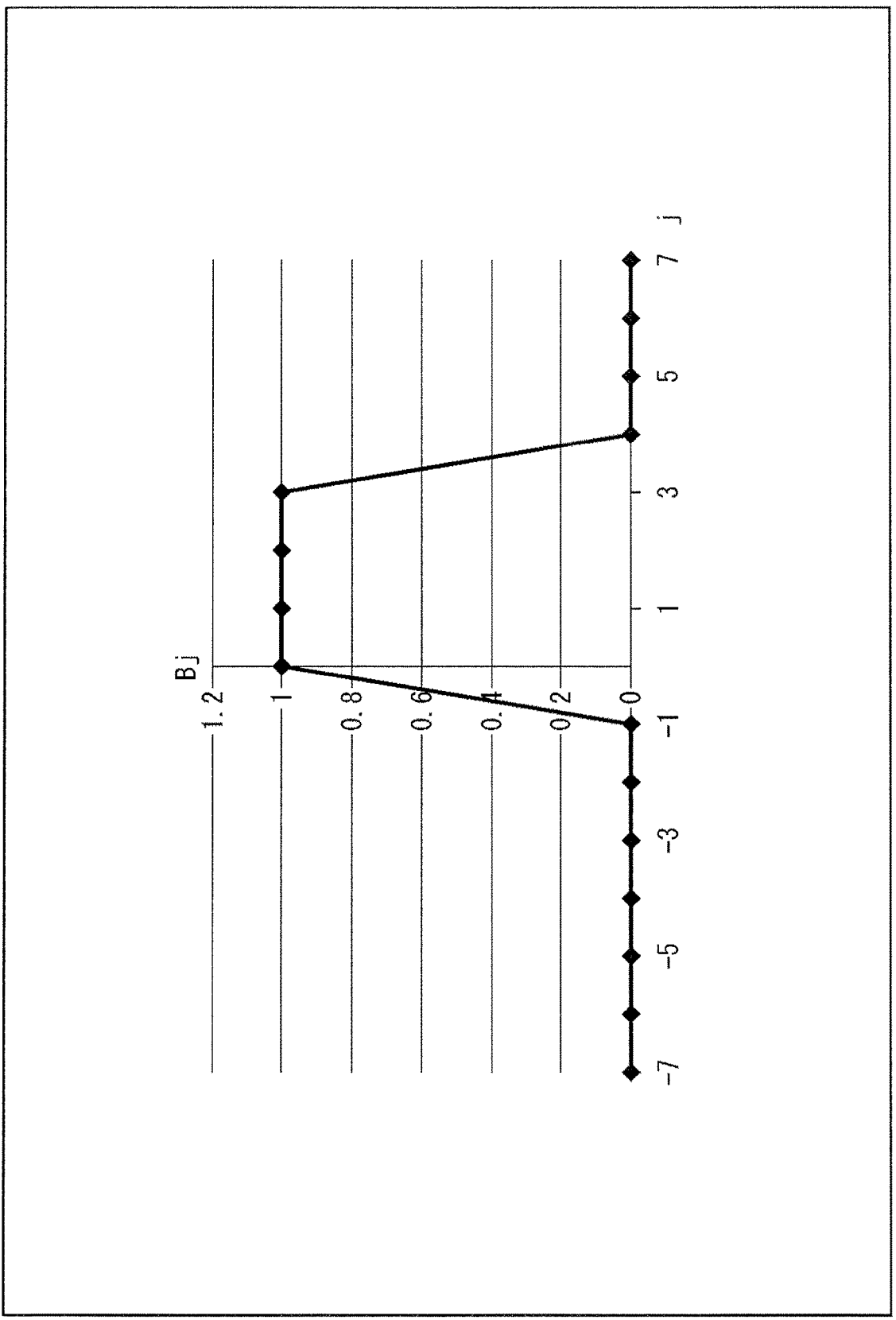
FIG. 16 is a diagram illustrating an example of a coefficient B.

As described in the first embodiment, it is possible to estimate the output pixel value $Z_{i,\alpha}$ as equation (4). FIG. 16 illustrates examples of values of a blur coefficient $B_{j,\alpha}$. Further, as described in the first embodiment, it is possible to estimate the output pixel value $Y_{i,\alpha}$ by the linear combination of the input pixel value $X_i$ as in equation (1).

From those equations, it is possible to express the pixel value $Z_{i,\alpha}$ by the following equation (10) using the pixel value $X_i$.

$$Z_{i,\alpha} = \sum_{j=0}^{3} B_{j,\alpha} \cdot \sum_{k=-m}^{m} D_{k,\alpha} \cdot X_{i+j+k}. \tag{10}$$

In order to optimize output pixel value $Y_{i,\alpha}$ so that the projection pixel value $Z_{i,\alpha}$ projected on the screen 113 coincides with (is a constant-fold value of) the input pixel value $X_i$, it is necessary that the error $e_{i,\alpha}$ between the input image and the projection image be minimized. It is possible to express the pixel value $Z_{i,\alpha}$ by the following equation (11) using the error $e_{i,\alpha}$.

$$Z_{i,\alpha} = 4X_i + e_{i,\alpha} \tag{11}$$

From equations (10) and (11), it is possible to express the error $e_{i,\alpha}$ as the following equation (12).

$$e_{i,\alpha} = \sum_{j=0}^{3} B_{j,\alpha} \cdot \sum_{k=-m}^{m} D_{k,\alpha} \cdot X_{i+j+k} - 4X_i \tag{12}$$

Accordingly, the learning section 211 calculates the coefficient $D_{k,\alpha}$ by the least squares method using a moving image prepared in advance as a learning sample, a known value as $B_{j,\alpha}$, a variable as $D_{k,\alpha}$, a learning sample as $X_{i,s}$, and a minimization function as the following equation (13).

$$\min \sum_{s}^{sample} e_{i,\alpha,s}^2 = \sum_{s}^{sample} \left( \sum_{j=0}^{3} B_{j,\alpha} \cdot \sum_{k=-m}^{m} D_{k,\alpha} \cdot X_{i+j+k,s} - 4X_{i,s} \right)^2. \tag{13}$$

Figure 17:
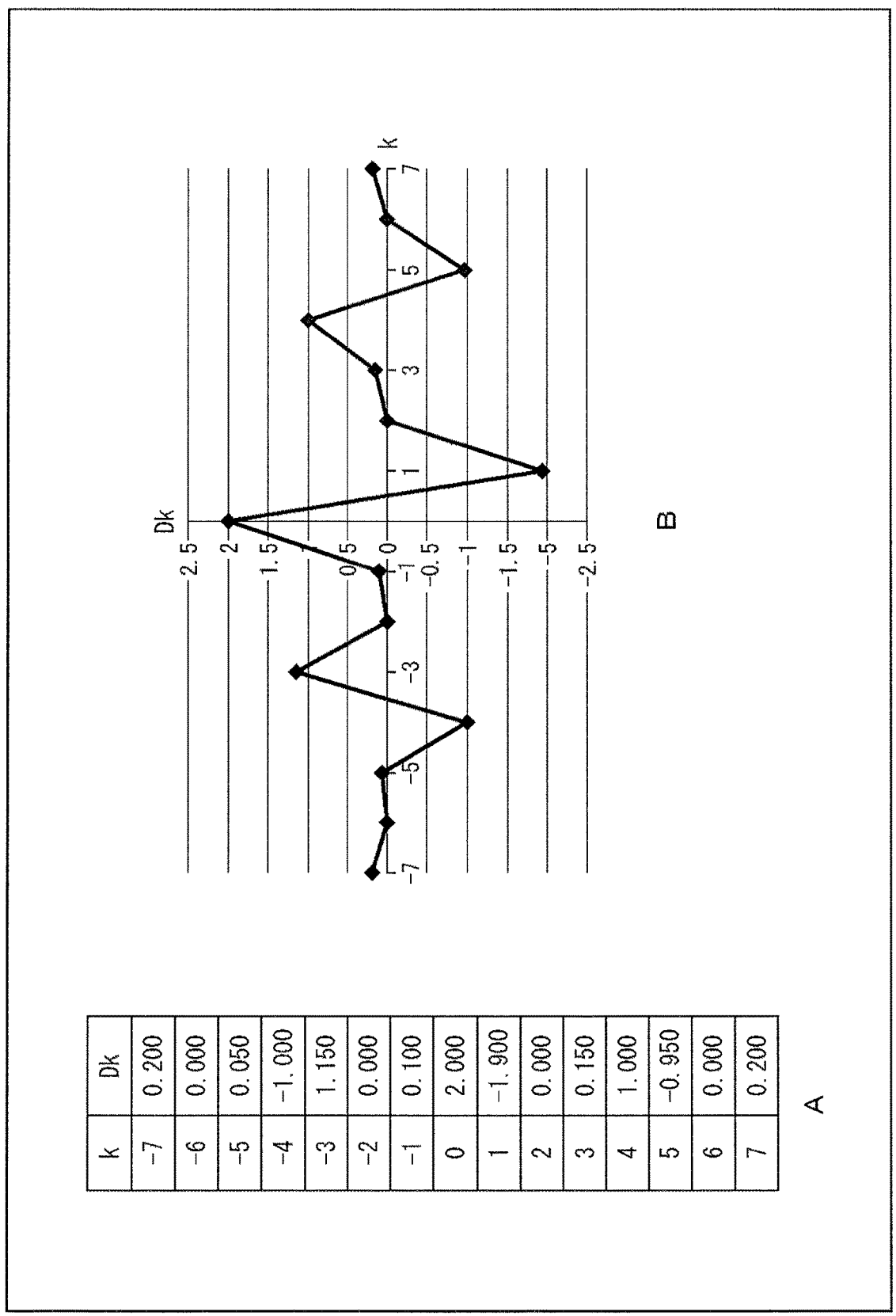
FIG. 17 is a diagram illustrating an example of a coefficient $D_k$.

Calculation examples of the coefficient $D_{k,\alpha}$ where m=7 are illustrated in FIG. 17. A of FIG. 17 is an exemplary table of the values of coefficient $D_{k,\alpha}$ for the respective k cases, and B of FIG. 17 is a graph based on the table.

The learning section 211 supplies the parameter α and coefficient $D_{k,\alpha}$ obtained as a result of the above-described learning to the predictor 212.

The predictor 212 performs a process related to the predictive calculation of predicting the output image (output pixel value $Y_{i,\alpha}$) from the input image (input pixel value $X_i$). For example, the predictor 212 predicts the output pixel value $Y_{i,\alpha}$ from the input pixel value $X_i$ using the parameter α and the coefficient $D_{k,\alpha}$ supplied by the learning section 211 and equation (12). The predictor 212 performs the predictive calculation in the similar manner for each attentional coordinate to calculate the output pixel value $Y_{i,\alpha}$. By doing so, the output pixel value $Y_{i,\alpha}$ is determined such that the error (difference value) between the projection image and the input image is minimized. The predictor 212 provides the output pixel value $Y_{i,\alpha}$ and the parameter α to the distributor 122 at a frame rate of 120 frames per second.

The distributor 122 sequentially distributes the frame images (the pixel values of which have been corrected) subjected to the image process by the image processor 121 to the projection devices 112. The distributor 122 sequentially distributes the parameter α supplied from the image processor 121 to the projection devices 112.

Each projection device 112 outputs the frame image distributed to itself at the output time corresponding to the parameter α distributed to itself (perform projection on the screen 113). In this manner, the projection image projected on the screen 113 is adjusted in the pixel value (luminance value) and the output time so that the error with the input image is minimized. Therefore, it is possible to suppress the reduction in the subjective image quality.

It is to be noted that, since four frame images are not superimposed on the projection image in the sections of the frame numbers i=1, 2, and 3, the sections are not included in the constraint condition in the above. These sections may be separately calculated by establishing a constraint condition expression. By doing so, it is possible to suppress the reduction in the subjective image quality from the first frame. The image process of these sections may be omitted. By doing so, it is possible to suppress the increase in a load due to the image process.

[Flow of Image Display Process]

Next, a flow of a process executed in the image projection system 100 will be described. Also in this case, the image projection system 100 performs the image display process when projecting a high frame rate moving image as described above. Since the flow of the image display process is similar to that of the case of the first embodiment (flowchart in FIG. 10), the explanation thereof is omitted.

[Flow of Image Process]

Next, referring to a flowchart of FIG. 18, an exemplary flow of the image process executed in step S101 of FIG. 10 will be described.

When the image process is started, a moving image prepared in advance as a learning sample is inputted. The storage 131 of the image processor 121 stores all frame images of the moving image in step S201.

In step S202, the learning section 211 performs the learning process and determines the parameter α indicating the output time and the filter coefficient $D_{k,\alpha}$.

In step S203, the predictor 212 performs a prediction process of predicting the output pixel value $Y_{i,\alpha}$ using the parameter α and filter coefficient $D_{k,\alpha}$ determined in step S202. When the output pixel value $Y_{i,\alpha}$ is determined, the image process ends, and the process returns to FIG. 10.

[Flow of Learning Process]

Next, referring to a flowchart of FIG. 19, an exemplary flow of the learning process executed in step S202 of FIG. 18 will be described.

Figure 12:
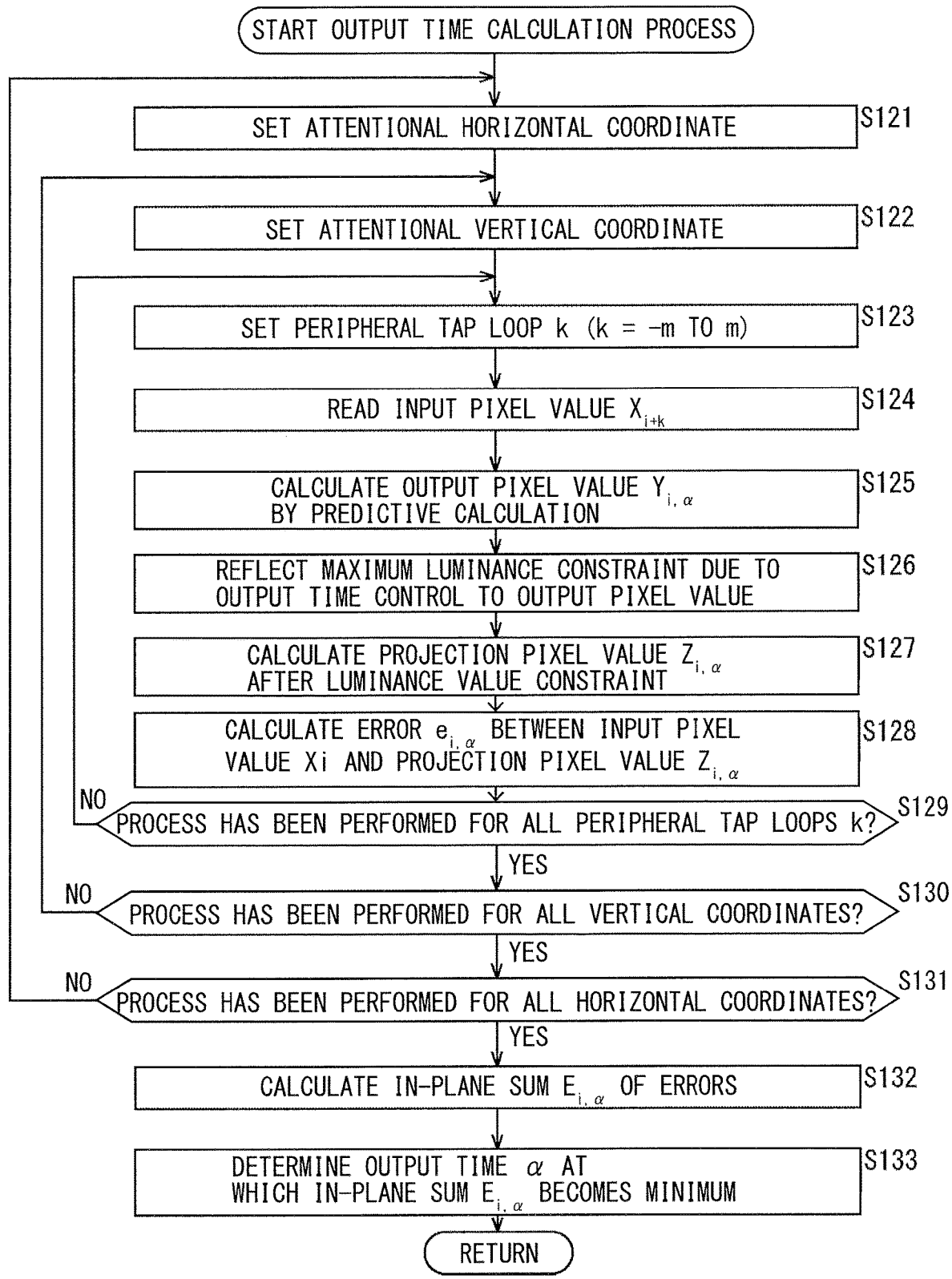
FIG. 12 is a flowchart for explaining an example of a flow of an output time calculation process.

When the learning process is started, the learning section 211 executes steps S211 to S223 in the similar manner to steps S121 to S133 of the output time calculation process of FIG. 12, and determines the parameter α.

In step S224, the learning section 211 uses the parameter α to calculate filter coefficient $D_{k,\alpha}$ by the least squares method using the minimization function as the above equation (13). When the filter coefficient $D_{k,\alpha}$ is calculated, the learning process ends, and the process returns to FIG. 18.

[Flow of Prediction Process]

Figure 20:
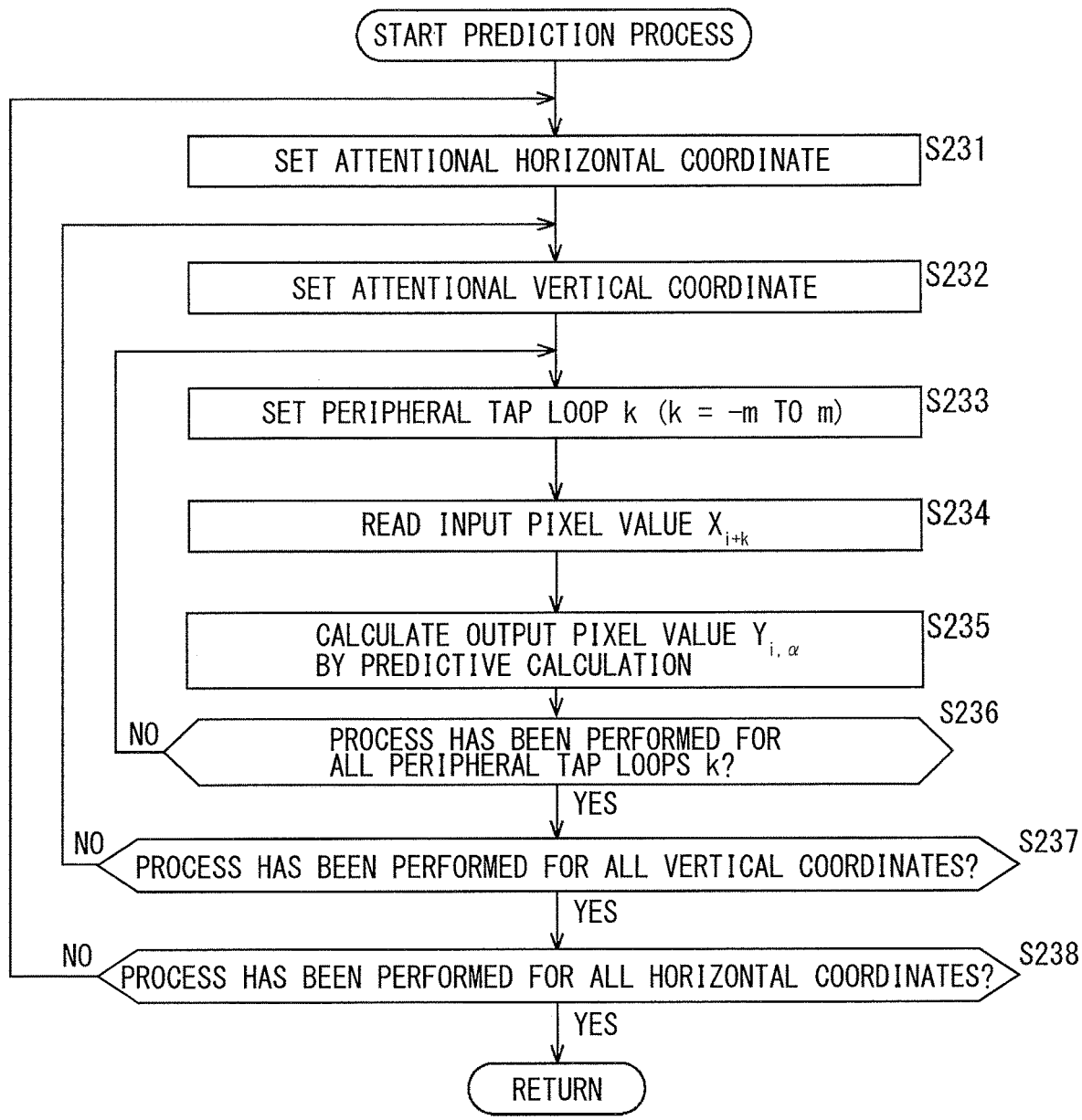
FIG. 20 is a flowchart for explaining an example of a flow of a prediction process.

Next, referring to a flowchart of FIG. 20, an exemplary flow of the prediction process executed in step S203 of FIG. 18 will be described.

When the prediction process is started, the predictor 212 sets, in step S231, an attentional horizontal coordinate, which is a horizontal coordinate to be processed, from the unprocessed horizontal coordinates of the frame image of the input image.

In step S232, the predictor 212 sets an attentional vertical coordinate, which is a vertical coordinate to be processed, from the unprocessed vertical coordinates of the frame image of the input image.

In step S233, the predictor 212 sets the peripheral tap loop k (k=−m to m).

In step S234, the predictor 212 reads the input pixel value $X_{i+k}$ from the storage 131.

In step S235, the predictor 212 calculates the output Y pixel value$_{i,\alpha}$ by the predictive calculation. In other words, the predictor 212 substitutes the filter coefficient $D_{k,\alpha}$ determined by the learning process of FIG. 19 into equation (1), and determines the output pixel value $Y_{i,\alpha}$ using equation (1).

In step S236, the predictor 212 determines whether or not all the peripheral tap loops k have been processed. If it is determined that there is an unprocessed peripheral tap loop k, the process returns to step S233, and the subsequent steps are repeated. That is, steps S233 to S236 are repeated for each peripheral tap loop k. If it is determined in step S236 that the process has been performed for all the peripheral tap loops k, the process proceeds to step S237.

In step S237, the predictor 212 determines whether or not all the vertical coordinates have been processed. If it is determined that there is an unprocessed vertical coordinate, the process returns to step S232, and the subsequent steps are repeated. That is, steps S232 to S237 are repeated for each vertical coordinate. If it is determined in step S237 that the process has been performed for all the vertical coordinates, the process proceeds to step S238.

In step S238, the predictor 212 determines whether or not all the horizontal coordinates have been processed. If it is determined that there is an unprocessed horizontal coordinate, the process returns to step S231, and the subsequent steps are repeated. That is, steps S231 to step S238 are repeated for each horizontal coordinate. If it is determined in step S238 that the process has been performed for all the horizontal coordinates, the prediction process ends, and the process returns to FIG. 19.

By performing each step as described above, the image processor 121 is not only able to control the output time but is also able to correct the pixel value so that the error between the input image and the projection image is minimized. Therefore, the image projection system 100 is able to suppress the occurrence of the superimposition blur in the projection image, and is also able to suppress the reduction in the brightness of the projection image. That is, the image projection system 100 is able to suppress the reduction in the subjective image quality.

By performing image projection as described above, the image projection system 100 is able to project a high frame rate image using a low frame rate projection device 112. Therefore, it is possible to achieve high frame rate projection more inexpensively. Further, as described above, the image projection system 100 is able to suppress the reduction in the subjective image quality only by converting image signals by the image processor 121 without necessitating special viewing devices such as glasses. That is, the image projection system 100 is able to more easily and inexpensively suppress the reduction in the subjective image quality. In addition, the image projection system 100 is able to achieve even higher frame rate image projection by increasing the number of projection devices 112.

In the above description, the learning and the prediction are performed for all the pixels of the frame image, but the present disclosure is not limited thereto, and the learning and the prediction may be performed for some of the pixels. In such cases, the learning and the prediction may be performed on the frame image for a plurality of times, or pixels to be interpolated may be provided by using a predetermined function or the like without performing the learning and the prediction.

[Method 4 of Determining Parameter α]

As in the similar manner as in the case of the first embodiment, the method of determining the parameter α indicating the output time is optional and is not limited to the above-mentioned examples. For example, the parameter α may be set using the error $E_{i,\alpha}$ of the entire frame image, which is the sum in the entire image of the error $e_{clip,\ i,\ \alpha}$ (first difference) due to the luminance reduction and the correction error $e_{deblur,\ i,\ \alpha}$ (second difference) due to the afterimage deterioration, similar to that described in [Method 2 of Determining Parameter α] of the first embodiment.

For example, the learning section 211 is able to suppress the reduction in the subjective image quality of the projection image, by setting the output time (parameter α) so as to suppress an increase in the error $E_{i,\alpha}$ of the entire frame image. In addition, for example, the learning section 211 is able to further suppress the reduction in the subjective image quality of the projection image, by setting the output time (parameter α) (i.e., determining the optimal output time) so that the error $E_i$, of the entire frame image are minimized.

[Flow of Learning Process]

Also in this case, the image display process is performed in the similar flow to the case described referring to the flowchart of FIG. 10. The image process executed in step S101 of the image display process is also performed in the same flow as that described referring to the flowchart of FIG. 18.

Figure 21:
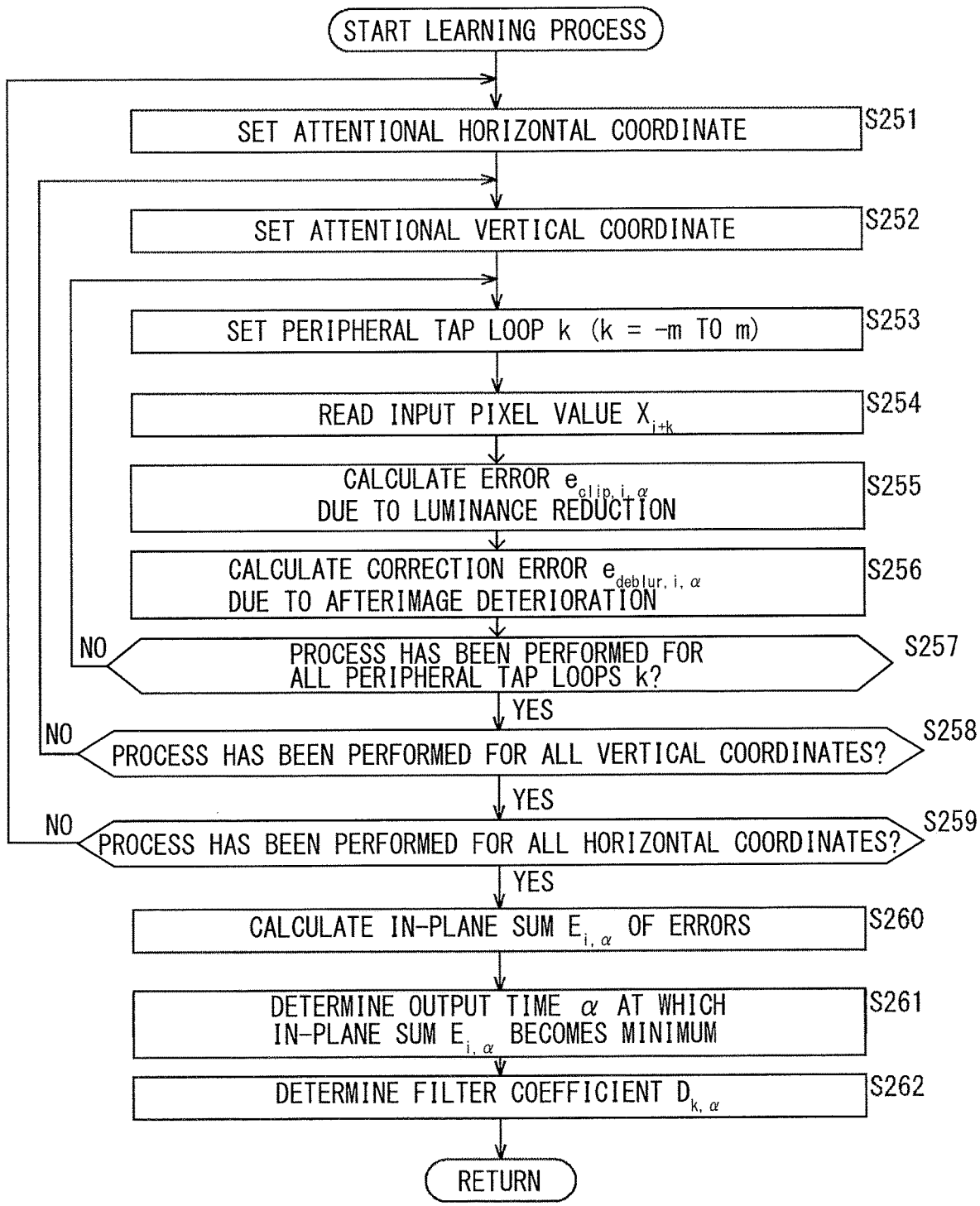
FIG. 21 is a flowchart for explaining an example of a flow of a learning process.

Further, referring to a flowchart of FIG. 21 an exemplary flow of the learning process in this case executed in step S202 of FIG. 18 will be described.

Also in this case, when the learning process is started, the learning section 211 sets, in step S251, an attentional horizontal coordinate, which is a horizontal coordinate to be processed, from the unprocessed horizontal coordinates of the frame image of the input image.

In step S252, the learning section 211 sets an attentional vertical coordinate, which is a vertical coordinate to be processed, from the unprocessed vertical coordinates of the frame image of the input image.

In step S253, the learning section 211 sets the peripheral tap loop k (k=−m to m).

In step S254, the learning section 211 reads the input pixel value $X_{i+k}$ from the storage 131.

In step S255, the learning section 211 calculates the error $e_{clip,\ i,\ \alpha}$ due to the luminance reduction, as indicated in the above equation (7).

In step S256, the learning section 211 calculates the correction error $e_{deblur,\ i,\ \alpha}$ due to the afterimage deterioration, as indicated in the above equation (8).

In step S257, the learning section 211 determines whether or not all the peripheral tap loops k have been processed. If it is determined that there is an unprocessed peripheral tap loop k, the process returns to step S253, and the subsequent steps are repeated. That is, steps S253 to S257 are repeated for each peripheral tap loop k. If it is determined in step S257 that the process has been performed for all the peripheral tap loops k, the process proceeds to step S258.

In step S258, the learning section 211 determines whether or not all the vertical coordinates have been processed. If it is determined that there is an unprocessed vertical coordinate, the process returns to step S252, and the subsequent steps are repeated. That is, steps S252 to S258 are repeated for each vertical coordinate. If it is determined in step S258 that the process has been performed for all the vertical coordinates, the process proceeds to step S259.

In step S259, the learning section 211 determines whether or not all the horizontal coordinates have been processed. If it is determined that there is an unprocessed horizontal coordinate, the process returns to step S251, and the subsequent steps are repeated. That is, steps S251 to step S259 are repeated for each horizontal coordinate. If it is determined in step S259 that the process has been performed for all the horizontal coordinates, the process proceeds to step S260.

In step S260, the learning section 211 calculates the in-plane sum $E_{i, \alpha}$ of the errors $e_{clip, i, \alpha}$ due to the luminance reduction for each pixel calculated in step S255 and the supplement errors $e_{deblur, i, \alpha}$ due to the afterimage deterioration for each pixel calculated in step S256, as indicated in the above equation (9).

In step S261, the learning section 211 determines the optimal output time (the parameter $\alpha$) at which the in-plane sum $E_{i, \alpha}$ calculated in step S260 is the minimum.

Figure 18:
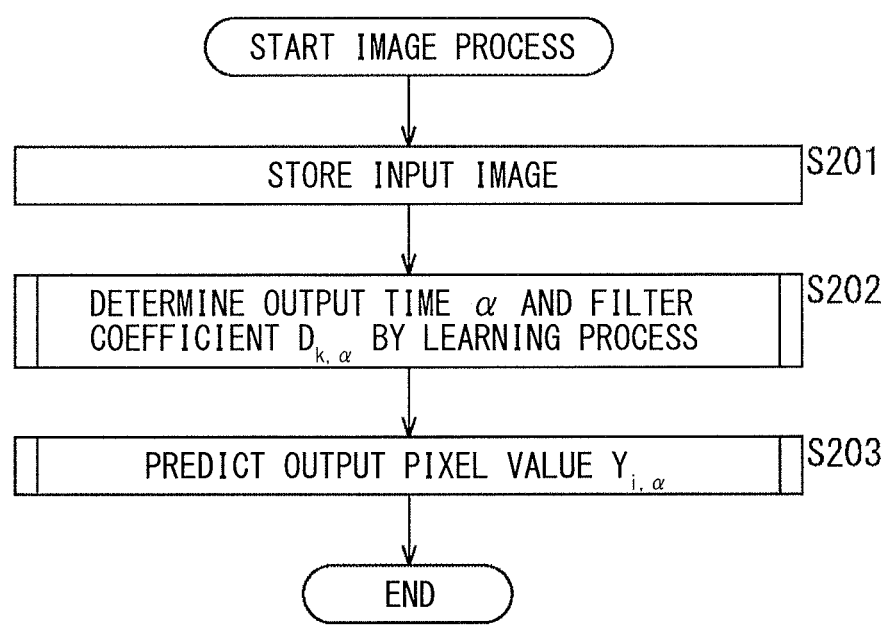
FIG. 18 is a flowchart illustrating an example of a flow of an image process.
Figure 19:
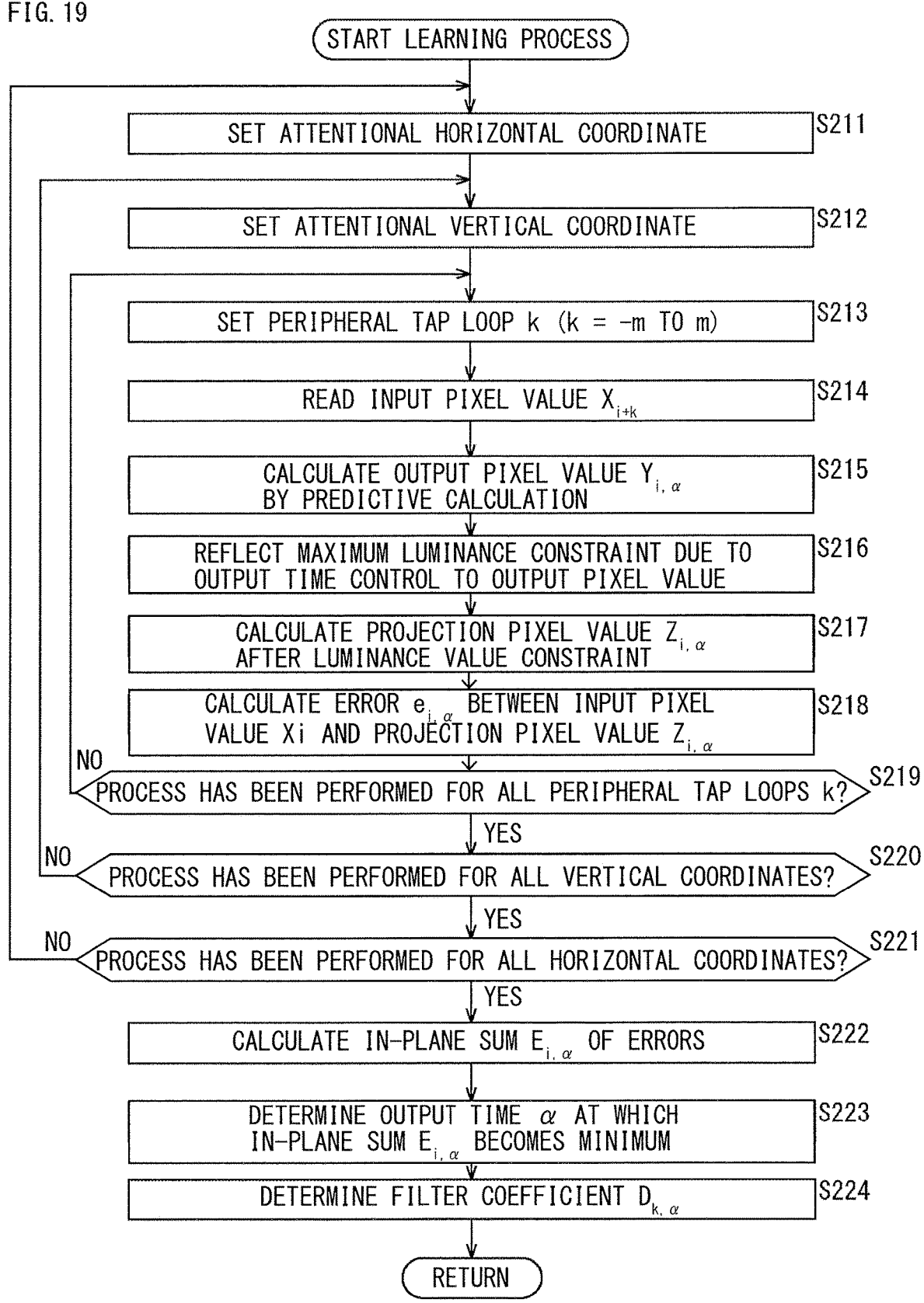
FIG. 19 is a flowchart illustrating an example of a flow of a learning process.

When step S261 ends, the output time calculation process ends and the process returns to FIG. 18.

By performing each step as described above, the learning section 211 (image processor 121) is, also in this case, able to control the output time of each frame image so that the error between the input image and the projection image is minimized. Therefore, the image projection system 100 is able to suppress the reduction in the subjective image quality due to the occurrence of the superimposition blur and the reduction in the luminance in the projection image.

By performing image projection as described above, the image projection system 100 is able to project a high frame rate image using a low frame rate projection device 112. Therefore, it is possible to achieve high frame rate projection more inexpensively. Further, as described above, the image projection system 100 is able to suppress the reduction in the subjective image quality only by converting image signals by the image processor 121 without necessitating special viewing devices such as glasses. That is, the image projection system 100 is able to more easily and inexpensively suppress the reduction in the subjective image quality. In addition, the image projection system 100 is able to achieve even higher frame rate image projection by increasing the number of projection devices 112.

In the above description, the difference (error) between the input image and the projection image is determined for all the pixels of the frame image, but the difference is not limited thereto, and the error may be calculated for some pixels and the in-plane sum of the error may be determined using the errors of the some pixels.

In the above description, the filtering operation is used when estimating the output pixel value $Y_{i, \alpha}$ and the projection pixel value $Z_{i, \alpha}$, but the estimation method is optional and is not limited to the filtering operation. For example, other methods may be used, such as optimization by linear programming.

4. Stereoscopic Image Projection by Active Shutter Scheme

In the above description, the increase of the overall error between the error due to the luminance reduction and the error due to the superimposition deviation occurred when the projection images of the frame images differing in time points are superimposed upon each other has been described; however, it is also possible to apply the present technology, for example, for suppressing the increase in an error due to a cross talk of a plurality of frame images having different perspectives from each other for stereoscopic viewing.

In a case where a moving image including a left-eye frame image and a right-eye frame image is projected, the left-eye frame image and the right-eye frame image (a plurality of frame images having differing perspectives from each other) are alternately projected, so that the frame images may be superimposed upon each other in the projection image. In this manner, the cross talk occurs in which the plurality of frame images having different perspectives from each other are superimposed, and there is a possibility that the subjective image quality may be reduced.

Generally, the longer the time during which each frame image is viewable by the user, the more likely the crosstalk is to occur. For example, the longer the output time of each frame image (the longer the projection time), the greater the possibility that the cross talk may occur.

[Control on Time During which Projection Image is Viewable]

Accordingly, similarly to the case of the first embodiment or the second embodiment, the time during which the projection image of each frame image of the moving image is viewable by the user may be controlled based on each frame image of the moving image. For example, the time during which the projection image of each frame image of the moving image is viewable by the user may be controlled so as to suppress an increase in the overall error between the error due to the luminance reduction and the error due to the cross talk. By doing so, it is possible to suppress the reduction in the subjective image quality of the projection image.

5. Third Embodiment (Image Projection System/Control of Output Time)

[Image Projection System]

Figure 22:
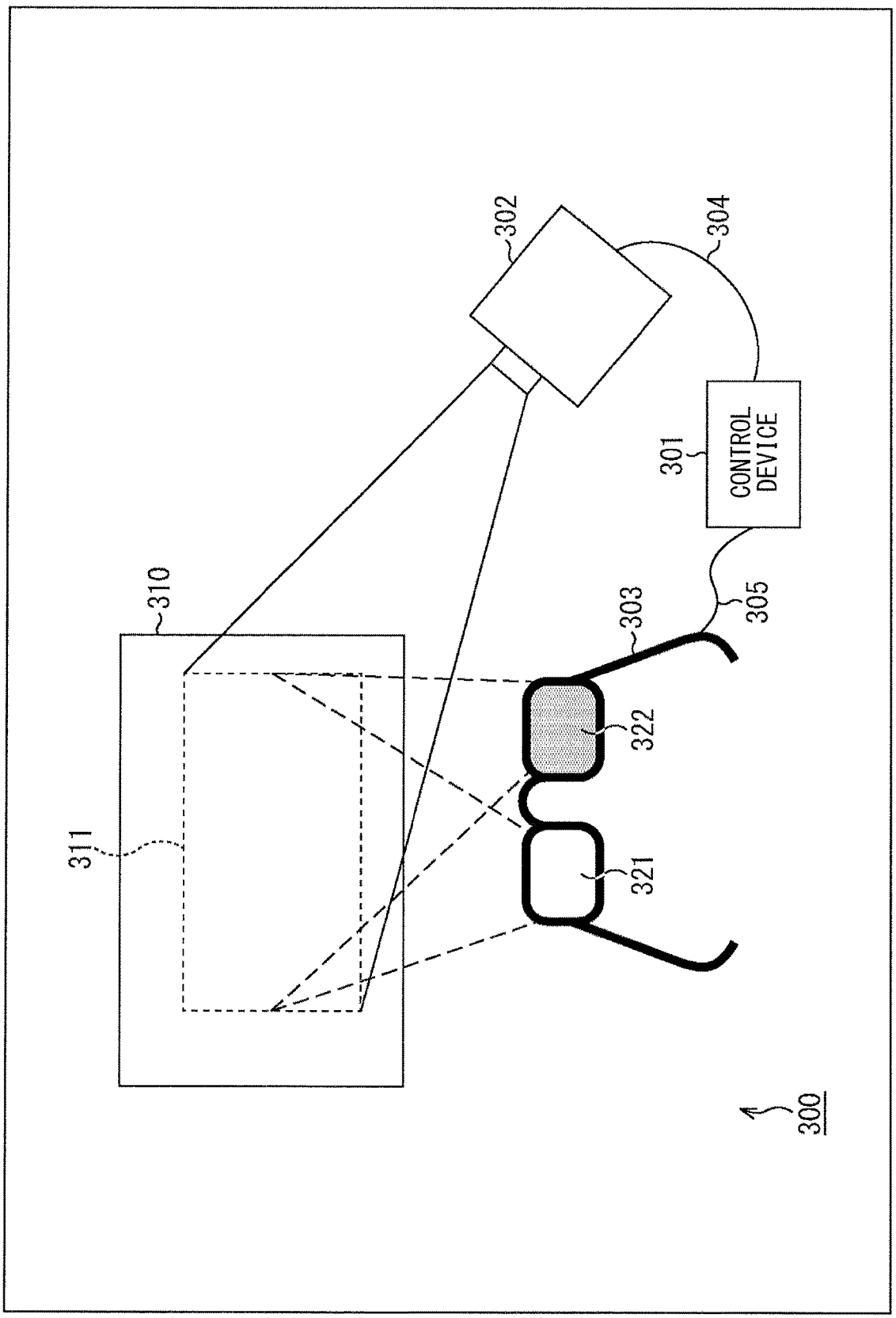
FIG. 22 is a block diagram illustrating a main configuration example of an image projection system.

FIG. 22 is a block diagram illustrating a main configuration example of an embodiment of an image projection system to which the present technology is applied. An image projection system 300 illustrated in FIG. 22 illustrates an embodiment of a stereoscopic image projection system of an active shutter scheme which makes it possible to achieve a stereoscopic viewing by a user viewing a projection image through a spectacle-type stereoscopic device having a shutter (light-shielding mechanism).

As illustrated in FIG. 22, the image projection system 300 includes, for example, a control device 301, a projection device 302, and a stereoscopic device 303. The control device 301 is coupled to the projection device 302 via a cable 304 and to the stereoscopic device 303 via a cable 305.

The control device 301 provides the input image to the projection device 302 via the cable 304 and controls the image projection performed by the projection device 302. The control device 301 controls driving of the stereoscopic device 303 via the cable 305.

The projection device 302 is controlled by the control device 301 and sequentially projects frame images of the moving image supplied from the control device 301 onto a screen 310.

The control device 301 supplies the projection device 302 with a moving image for stereoscopic viewing including frame images of a plurality of perspectives with parallax to each other (e.g., a right-eye frame image and a left-eye frame image). The projection device 302 sequentially projects the frame images (e.g., the right-eye frame image and the left-eye frame image) of each perspective of the moving image onto the screen 310. It is to be noted that the moving image for stereoscopic viewing may be supplied to the control device 301 from the outside as an input image, or may be generated by the control device 301. For example, the control device 301 may make each frame of a normal moving image supplied from the outside to have a plurality of perspectives and may convert the resultant into a moving image for stereoscopic viewing.

The stereoscopic device 303 is a spectacle-type device that allows a user wearing the stereoscopic device 303 to stereoscopically view a projection image 311 projected on the screen 310 by the projection device 302, and has a light-shielding mechanism that alternately performs light-shielding for a right eye and light-shielding for a left eye in accordance with the timings of projecting the right-eye frame image and the left-eye frame image of the moving image.

More specifically, the stereoscopic device 303 includes: a left-eye light-shielding section 321 which is positioned in front of the user's left eye in a state in which the stereoscopic device 303 is correctly worn by the user and which is able to block light incident on the left eye through the left-eye light-shielding section 321; and a right-eye light-shielding section 322 which is positioned in front of the user's right eye in a state in which the stereoscopic device 303 is correctly worn by the user and which is able to block light incident on the right eye through the right-eye light-shielding section 322. That is, the left-eye light-shielding section 321 is formed at the position of the lens for the left eye of normal glasses. Likewise, the right-eye light-shielding section 322 is formed at the position of the lens for the right eye of normal glasses.

The left-eye light-shielding section 321 is controlled by, for example, the control device 301, and is driven in synchronization with the timing at which the projection device 302 projects the right-eye frame image, and shields the right-eye frame image from the left eye of the user.

Likewise, the right-eye light-shielding section 322 is controlled by, for example, the control device 301, and is driven in synchronization with the timing at which the projection device 302 projects the left-eye frame image, and shields the left-eye frame image from the right eye of the user.

In this way, the user wearing the stereoscopic device 303 is able to view the projection image of the left-eye frame image with the left eye and view the projection image of the right-eye frame image with the right eye. Therefore, the user is able to stereoscopically view the projection image 311 projected on the screen 310.

[Light-Shielding Control]

The control on the driving of the stereoscopic device 303 for the stereoscopic viewing as described above will be described in more detail.

Figure 23:
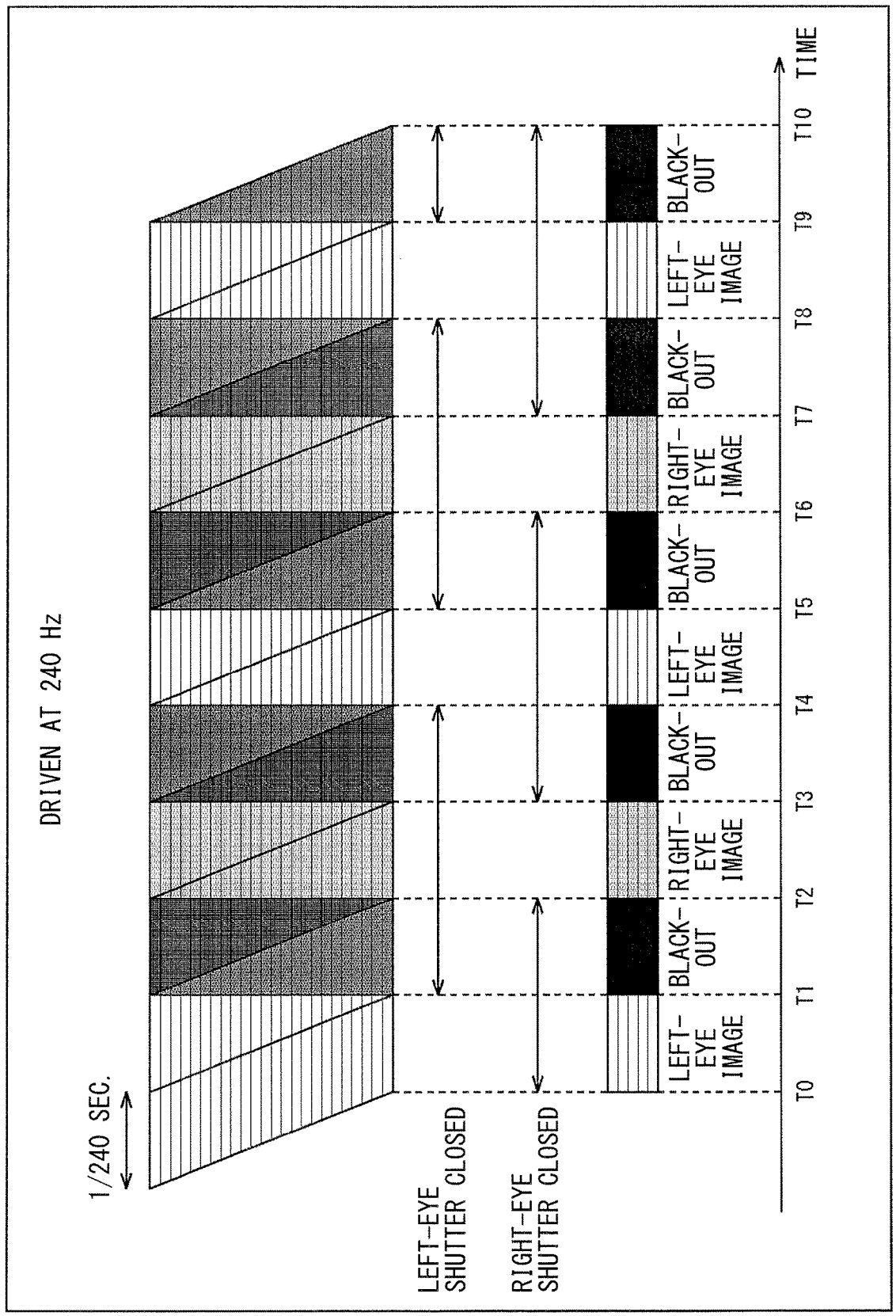
FIG. 23 is a diagram for explaining an example of a state of an image projection and light shielding.

FIG. 23 is a timing chart illustrating an example of a state of projection and light-shielding control. The projection device 302 projects each frame image as a parallelogram as the upper part of FIG. 23. The moving image has a frame rate of 240 frames per second (240 Hz), and each frame image is projected for $1/240$ second. The reason why the projection of each frame image is inclined like a parallelogram is that the projection timings are shifted for each line (row) by a line scan method. The horizontal lines in the parallelogram in the drawing indicate examples of the projection periods of the respective lines.

In response to such an image projection, the stereoscopic device 303 is controlled by the control device 301 and closes (shields) the left-eye light-shielding section 321 (also referred to as left-eye shutter) and the right-eye light-shielding section 322 (also referred to as right-eye shutter) at the timings indicated by the double-headed arrows in FIG. 23.

As illustrated in FIG. 23, in a period where only the right-eye light-shielding section 322 is closed (e.g., from time point T0 to time point T1, from time point T4 to time point T5, from time point T8 to time point T9, etc.), the user is able to view the projection image (left-eye image) of the left-eye frame image with the left eye. In a period where only the left-eye light-shielding section 321 is closed (e.g., from time point T2 to time point T3, from time point T6 to time point T7, etc.), the user is able to view the projection image (right-eye image) of the right-eye frame image with the right eye. In other words, the user is able to view (stereoscopically) the projection image 311 as a stereoscopic view.

That is, the control device 301 controls the projection device 302 to cause the right-eye frame image and the left-eye frame image of the moving image to be sequentially projected, and controls the times during which the projection images of the right-eye frame image and the left-eye frame image of the moving image are viewable by the user, when the user is viewing the projection images of the right-eye frame image and the left-eye frame image of the moving image via the stereoscopic device 303.

In this case, instead of controlling the output time of the images by the projection device 302, the control device 301 controls the time during which the projection image of each frame image of the moving image is viewable by the user by controlling the light-shielding by the stereoscopic device 303.

Incidentally, as described above, since the projection device 302 performs the image projection by the line scan method, the projection timings are shifted for each line (row). Therefore, as illustrated in FIG. 23, a cross talk occurs in which the left-eye frame image and the right-eye frame image are superimposed upon each other. Since the frame images of the respective perspectives have parallax with respect to each other, if such a cross talk occurs, the subjective image quality may be reduced.

As also illustrated in FIG. 23, the stereoscopic device 303 closes both the left-eye light-shielding section 321 and the right-eye light-shielding section 322 in a period during which the left-eye frame image and the right-eye frame image are superimposed upon each other overlap in the projection image (e.g., a period from T1 to T2, a period from T3 to T4, a period from T5 to T6, a period from T7 to T8, a period from T9 to T10, etc.). In other words, in this period, the light-shielding for the right eye and the light-shielding for the left eye are overlapped, and the user is unable to see the left-eye image or the right-eye image (blackout). By providing such a blackout period, it is possible to suppress occurrence of the cross talk in which the frame images of respective perspectives are superimposed upon each other.

However, the longer the period of the blackout, the lower the luminance of the projection image 311 viewed by the user (the greater the error due to the luminance reduction). Also, the shorter the period of the blackout, the more likely it is for the cross talk to occur (or the longer the period in which the cross talk occurs).

Therefore, the control device 301 controls the time during which the projection image of each frame image of the moving image is viewable by the user by controlling the time (also referred to as light-shielding time) in which the light-shielding for the right eye and the light-shielding for the left eye overlap. For example, the control device 301 controls the length of the light-shielding time so as to suppress the reduction in the subjective image quality of the projection image 311 viewed by the user.

It is to be noted that, in the above description, the control device 301 and the projection device 302 are coupled via wire by the cable 304; however, the control device 301 and the projection device 302 may perform wireless communication. In that case, it is possible to omit the cable 304. Further, in the above description, the control device 301 and the stereoscopic device 303 are coupled via wire by the cable 305; however, the control device 301 and the stereoscopic device 303 may perform wireless communication. In that case, it is possible to omit the cable 305.

[Control Device]

Figure 24:
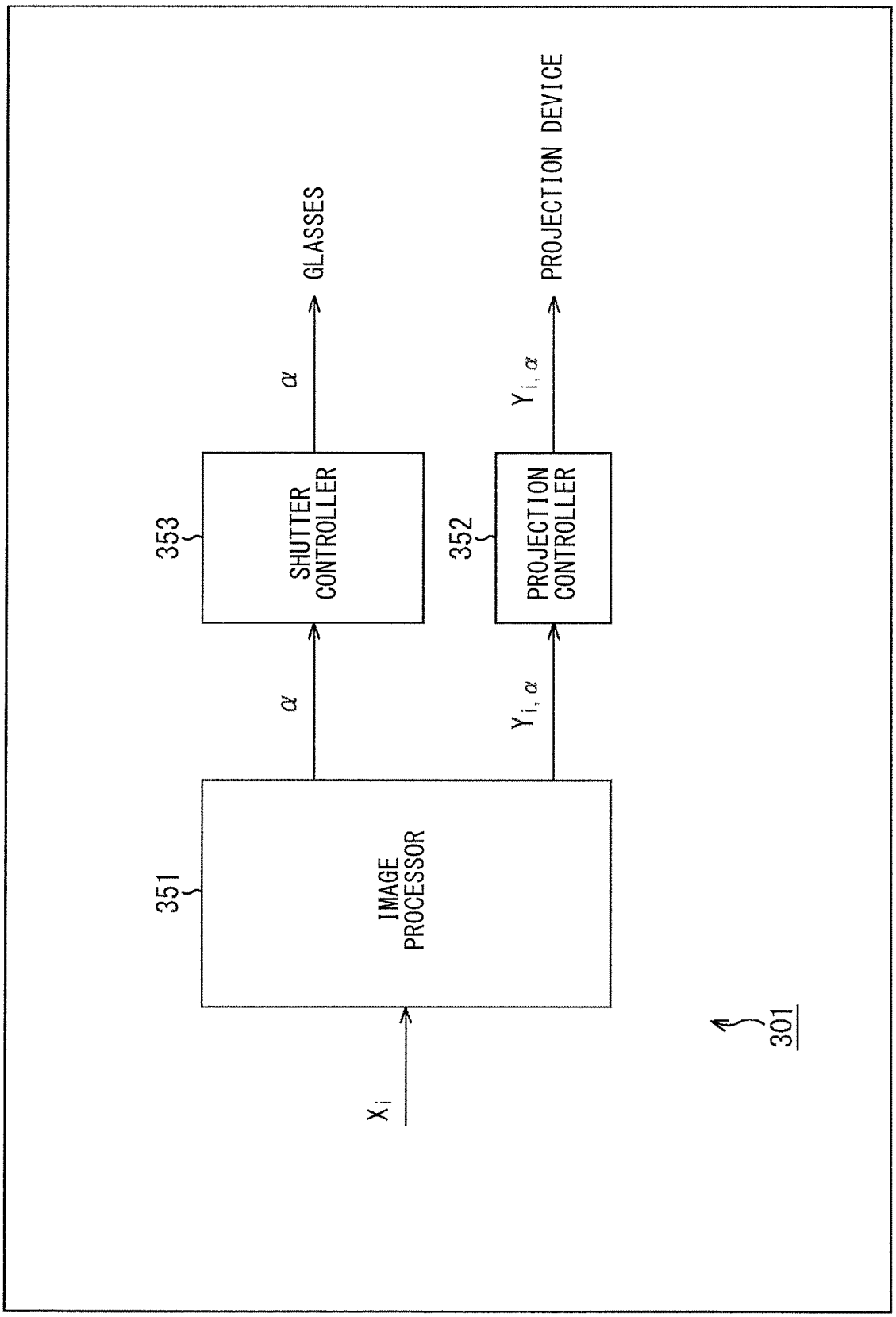
FIG. 24 is a block diagram of a main configuration example of a control device.

FIG. 24 illustrates a main configuration example of the control device 301. As illustrated in FIG. 24, the control device 301 includes an image processor 351, a projection controller 352, and a shutter controller 353.

The image processor 351 controls the time during which the projection image of each frame image of the moving image is viewable by the user on the basis of each frame image of the input image. More specifically, the image processor 351 controls, as the time during which the projection image of each frame image of the moving image is viewable by the user, the length of the light-shielding time, the light-shielding being performed by the stereoscopic device 303. For example, the image processor 351 calculates a parameter α representing the length of the light-shielding time on the basis of each frame image of the input image and supplies the parameter α to the shutter controller 353.

Further, the image processor 351 generates the output image (output pixel value $Y_{i,\alpha}$) on the basis of the input image (input pixel value $X_i$) and supplies the output image (output pixel value $Y_{i,\alpha}$) to the projection controller 352.

The projection controller 352 supplies the output image (output pixel value $Y_{i,\alpha}$) supplied from the image processor 351 to the projection device 302, and sequentially projects the frame images of the respective perspective of the moving image.

The shutter controller 353 supplies the parameter α supplied from the image processor 351 to the stereoscopic device 303 (glasses), and controls the driving of the stereoscopic device 303 so that the length of the light-shielding time, the light-shielding being performed by the stereoscopic device 303, becomes the length corresponding to the parameter α.

[Length of Light-Shielding Time and Error]

As described above, the longer the light-shielding time (the time during which light is shielded from both the left and right eyes), the lower the luminance of the projection image for the user. Thus, as a straight line 371 of a graph of FIG. 25, the longer the light-shielding time, the greater the error of the projection image to the input image (in this case, the luminance difference between the projection image and the input image).

Further, in general, the shorter the light-shielding time, the greater the cross talk. Therefore, as in a curve 372 of the graph of FIG. 25, the shorter the light-shielding time, the greater the error due to the cross talk (the difference between the projection image and the input image).

Figure 25:
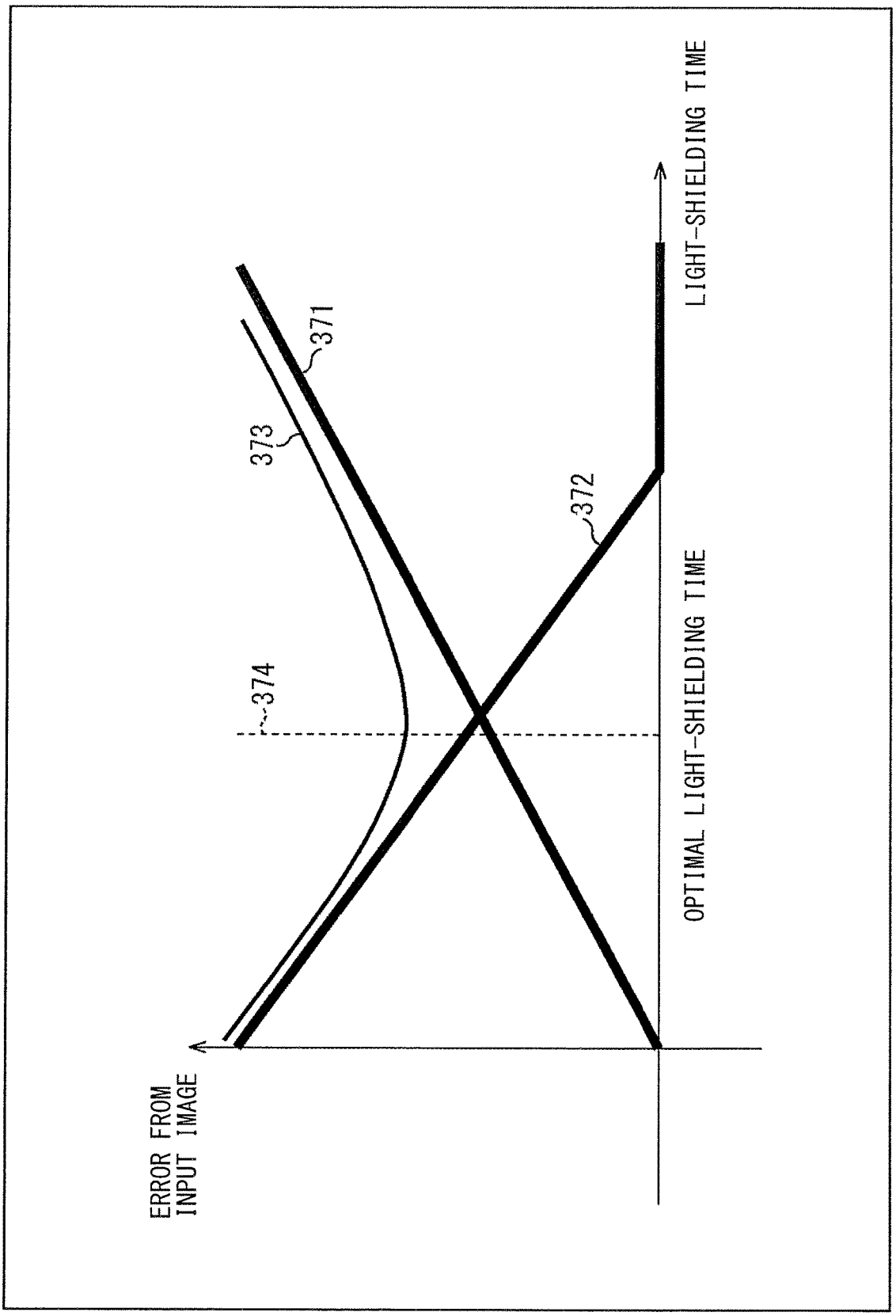
FIG. 25 is a diagram for explaining an example of a state of a control on a light-shielding time.

As illustrated in the graph of FIG. 25, the overall error considering both the above-mentioned error due to constraint of the expressible luminance values (the error due to the luminance reduction) and the error due to the cross talk is a curve like a curve 373, for example, from the states of increase and decrease of the straight line 371 and the curve 372. In other words, by controlling the output time of each frame image, the image processor 351 of FIG. 24 is able to control the magnitude of the overall error (the difference between the input image and the projection image due to the reduction in the luminance, and the difference between the input image and the projection image, which increases due to the increase in the time during which the projection image is viewable by the user).

Thus, the image processor 351 is able to control the light-shielding time, the light-shielding being performed by the stereoscopic device 303, by determining the parameter α representing the light-shielding time and supplying the parameter α to the respective projection device 112. As the light-shielding time changes, the time during which the projection image of each frame image is viewable by the user changes. In other words, the image processor 121 is able to control the time during which the projection image of each frame image is viewable by the user on the basis of each frame image of the input image.

As described above, by controlling "the light-shielding time" as "the time during which the projection image of each frame image is viewable by the user", it is possible to control the magnitude of the overall error of the error due to the luminance reduction and the error due to the cross talk. Therefore, the image processor 351 is able to suppress the reduction in the subjective image quality of the projection image by such control.

For example, the parameter α may be determined so that the image processor 351 suppresses the overall error (i.e., reduces the magnitude of the overall error) of the error due to the luminance reduction (the difference between the projection image and the input image due to the luminance reduction) and the error due to the cross talk (the difference between the projection image, which is in the state in which the right-eye frame image and left-eye frame image are superimposed upon each other, and the input image). By doing so, the image processor 351 is able to suppress the reduction in the subjective image quality of the projection image.

For example, the image processor 351 may determine the parameter α such that the overall error of the error due to the luminance reduction and the error due to the cross talk is minimized. For example, the image processor 351 may determine an optimal light-shielding time (dotted line 374), which is the light-shielding time at which the minimum value of the curve 373 is obtained in the graph of FIG. 25, and the shutter controller 353 may supply the parameter α representing the optimal light-shielding time to the stereoscopic device 303. By doing so, the image processor 351 is able to further suppress the reduction in the subjective image quality of the projection image.

It is to be noted that the image processor 351 may determine the parameter α for each frame image. For example, it is not necessary that all the frame images have the same output time. In other words, the image processor 351 may control the time during which the projection image is viewable by the user for each frame image of the input image.

In general, the error due to the luminance reduction and the error due to the cross talk change depending on the contents of the images. Therefore, by the image processor 351 determining the parameter α for each frame image according to the content of each frame image, it is possible to further suppress the overall error. That is, the image processor 351 is able to further suppress the reduction in the subjective image quality of the projection image.

[Image Processor]

It is be noted that the parameter α according to the present embodiment is a parameter representing the length of the light-shielding time, and if this is a ratio to the maximum value as in the first embodiment, (1−α) represents the "time not being light-shielded". That is, it can be said that the parameter α according to the present embodiment also represents time during which the projection image of each frame image of the moving image is viewable by the user, similarly to the first embodiment.

Therefore, the image processor 351 may perform a process similar to that described in the first embodiment. That is, it is possible to apply the description on the image processor 121 of the first embodiment to the image processor 351 by setting the parameter α to (1−α).

[Method 5 of Determining Parameter α]

In other words, the image processor 351 may include the configuration similar to that of the image processor 121 of the first embodiment and may perform the process similar to that of the image processor 121 of the first embodiment. Further, it is also possible to determine the parameter α in a manner similar to that described in

[Method 1 of Determining Parameter α].

[Flow of Image Display Process]

Next, a flow of a process executed in the image projection system 300 will be described. Referring to a flowchart of FIG. 26, an exemplary flow of an image display process in this case will be described.

When the image display process is started, the image processor 351 performs an image process for controlling "the time during which the projection image of each frame image of the moving image is viewable by the user" in step S301 on the basis of the input image.

In step S302, the projection controller 352 supplies each frame image of the input image to the projection device 112 and causes the frame images to be sequentially projected.

In step S303, the shutter controller 353 controls the driving of (the left-eye light-shielding section 321 and the right-eye light-shielding section 322 of) the stereoscopic device 303, and performs the light-shielding synchronized with the projection of the moving image so that the projection image is stereoscopically viewable by the user.

When the projections of the images end, the image display process is finished.

It is to be noted that the flow of the image process executed in step S301 is basically similar to the example described with reference to the flowchart of FIG. 11, and instead of calculating the output time, the light-shielding time may be calculated.

Further, the flow of the process of calculating the light-shielding time may be basically similar to the flow of the output time calculation process described with reference to the flowchart of FIG. 12.

By performing each process as described above, the image processor 351 is able to control the light-shielding time, the light-shielding being performed by the stereoscopic device 303, so that the error between the input image and the projection image is minimized. Therefore, the image projection system 300 is able to suppress the occurrence of the cross talk in the projection image and the reduction in the subjective image quality due to the luminance reduction.

It is to be noted that, although only one projection device 302 is illustrated in the image projection system 300 in FIG. 22, the number of projection devices 302 is optional, and may be two or more. In a case where a plurality of projection devices 302 are used, the frame images of the input image may be distributed as in the image projection system 100. In this manner, it is possible to project a high frame rate image using the low frame rate projection device 302. Therefore, it is possible to achieve high frame rate projection more inexpensively. The image projection system 300 is also able to achieve even higher frame rate image projection by increasing the number of projection devices 302.

In the above description, the difference (error) between the input image and the projection image is determined for all the pixels of the frame image, but the difference is not limited thereto, and the error may be calculated for some pixels and the in-plane sum of the error may be determined using the errors of the some pixels.

[Method 6 of Determining Parameter α]

Also, as in the first embodiment, the method of determining the parameter α indicating the light-shielding time is optional and is not limited to the above-mentioned examples. For example, the parameter α may be determined by basically the same method as the method described above in [Method 2 of Determining Parameter α].

[Flow of Processes]

Figure 26:
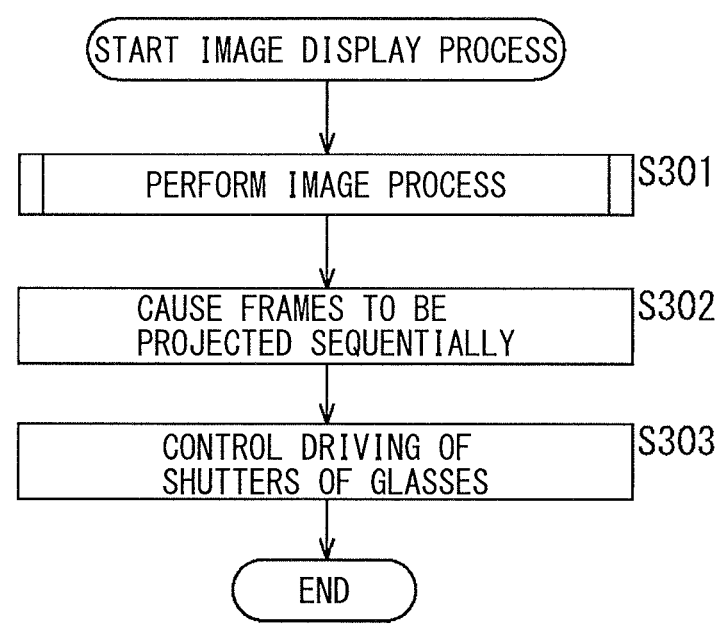
FIG. 26 is a flowchart for explaining an example of a flow of an image display process.

Also in this case, the image display process is performed in the similar flow to that described referring to the flowchart of FIG. 26. The image process executed in step S101 of the image display process is also performed in the similar flow to that described referring to the flowchart of FIG. 11. Further, the process of calculating the light-shielding time executed in step S112 of the image process may be performed basically in the similar manner to the flow of the output time calculation process described referring to the flowchart of FIG. 13.

By performing the processes as described above, the image processor 3M is also able in this case to control the light-shielding time, the light-shielding being performed by the stereoscopic device 303, so that the error between the input image and the projection image is minimized. Therefore, the image projection system 300 is able to suppress the occurrence of the cross talk in the projection image and the reduction in the subjective image quality due to the luminance reduction.

It is to be noted that, also in this case, the image projection system 300 is able to project a high frame rate image using a plurality of low frame rate projection devices 302. Therefore, it is possible to achieve high frame rate projection more inexpensively. Further, the image projection system 100 is able to achieve even higher frame rate image projection by increasing the number of projection devices 302.

In the above description, the difference (error) between the input image and the projection image is determined for all the pixels of the frame image, but the difference is not limited thereto, and the error may be calculated for some pixels and the in-plane sum of the error may be determined using the errors of the some pixels.

Further, the method of estimating the output pixel value $Y_{i,\alpha}$ and the projection pixel value $Z_{i,\alpha}$ is optional and is not limited to the filtering operation. For example, other methods may be used, such as optimization by linear programming.

6. Fourth Embodiment

[Image Projection System]

Also in the case of the third embodiment, in the similar manner to the case of the second embodiment, the image processor 351 may further perform an image process for suppressing an influence caused by superimposing a plurality of frame images in the projection image of each frame image of the input image with respect to each frame image of before the projection.

More specifically, for example, the image processor 351 may perform the image process of correcting the pixel value (luminance value) of each frame image in accordance with the superimposition of the projection image (a plurality of frame images). For example, the image processor 351 may correct the pixel value such that the error between input image and the projection image is minimized.

[Image Processor]

In this case, the image processor 351 may have basically the similar configuration as that of the image processor 121 (FIG. 14) of the second embodiment, and may basically perform the similar process. That is, it is possible to apply the description on the image processor 121 in the second embodiment to the image processor 351 by setting the parameter α to (1−α).

[Method 7 of Determining Parameter α]

It is to be noted that it is possible to calculate the filter coefficient $D_{k,\alpha}$ corresponding to the parameter α in the similar manner to the case of the second embodiment.

[Flow of Processes]

The image display process may be performed in the similar flow to the case of the third embodiment described referring to the flowchart of FIG. 26. The image process performed in step S301 may be performed in the similar flow to the case described referring to the flowchart of FIG. 18. The learning process executed in step S202 of FIG. 18 may be performed in the similar flow to the case described referring to the flowchart of FIG. 19. The prediction process executed in step S203 of FIG. 18 may be performed in the similar flow to the case described referring to the flowchart of FIG. 20.

By performing each step as described above, the image processor 351 is not only able to control the light-shielding time but is also able to correct the pixel value so that the error between the input image and the projection image is minimized. Therefore, the image projection system 300 is able to suppress the occurrence of the cross talk in the projection image, and is also able to suppress the reduction in the brightness of the projection image. That is, the image projection system 100 is able to suppress the reduction in the subjective image quality.

In the above description, the learning and the prediction are performed for all the pixels of the frame image, but the present disclosure is not limited thereto, and the learning and the prediction may be performed for some of the pixels. In such cases, the learning and the prediction may be performed on the frame image for a plurality of times, or pixels to be interpolated may be provided by using a predetermined function or the like without performing the learning and the prediction.

As described above with reference to FIG. 23, the projection device 302 projects images by the line scan method, and the timings of projections are shifted for each line. In contrast, since the stereoscopic device 303 shields the entire surface from light at the same time, a mixing ratio of the left-eye frame image and the right-eye frame image in the blackout period (light-shielding time) differs from line to line. Therefore, the image processor 351 may correct the pixel value for each line of each frame image of the moving image. By doing so, the image processor 351 is able to perform correction in accordance with the mixing ratio of the frame image in units of lines, and to perform pixel value correction more accurately. That is, it is possible to further suppress the reduction in the subjective image quality.

[Method 8 of Determining Parameter α]

Also in this case, the method of determining the parameter α indicating the light-shielding time is optional and is not limited to the above-mentioned examples. For example, the parameter α may be set using the error $E_{i,\alpha}$ of the entire frame image, which is the sum in the entire image of the error $e_{clip,\,i,\,\alpha}$ (first difference) due to the luminance reduction and the correction error $e_{deblur,\,i,\,\alpha}$ (second difference) due to the afterimage deterioration, similar to that described in [Method 2 of Determining Parameter α] of the first embodiment.

For example, the image processor 351 is able to suppress the reduction in the subjective image quality of the projection image, by setting the light-shielding time (parameter α) so as to suppress an increase in the error $E_{i,\,\alpha}$ of the entire frame image. In addition, for example, the image processor 351 is able to further suppress the reduction in the subjective image quality of the projection image, by setting the light-shielding time (parameter α) (i.e., determining the optimal light-shielding time) so that the error $E_i$, of the entire frame image are minimized.

[Flow of Processes]

Also in this case, the image display process is performed in the similar manner to the case of the third embodiment described referring to the flowchart of FIG. 26. The image process executed in step S301 may be performed in the similar flow to the case described referring to the flowchart of FIG. 18. The learning process executed in step S202 of FIG. 18 may be performed in the similar flow to the case described referring to the flowchart of FIG. 21. The prediction process executed in step S203 of FIG. 18 may be performed in the similar flow to the case described referring to the flowchart of FIG. 20.

By performing the processes as described above, the image processor 351 is also able in this case to control the output time of each frame image, so that the error between the input image and the projection image is minimized. Therefore, the image projection system 300 is able to suppress the occurrence of the cross talk in the projection image and the reduction in the subjective image quality due to the luminance reduction.

It is to be noted that the method of estimating the output pixel value $Y_{i,\,\alpha}$ and the projection pixel value $Z_{i,\,\alpha}$ is optional and is not limited to the filtering operation. For example, other methods may be used, such as optimization by linear programming.

7. Fifth Embodiment

[Another Configuration 1]

The configuration of the image projection system 100 to which the present technology is applied is not limited to the above-described examples. For example, the number of central processing units 111 and projection devices 112 are optional. For example, the number of central processing units 111 may be two or more, the number of projection devices 112 may be three or less, or may be five or more. The specifications (e.g., resolution, brightness, frame rate, etc.) of the respective projection devices 112 may or may not be the same.

Figure 27:
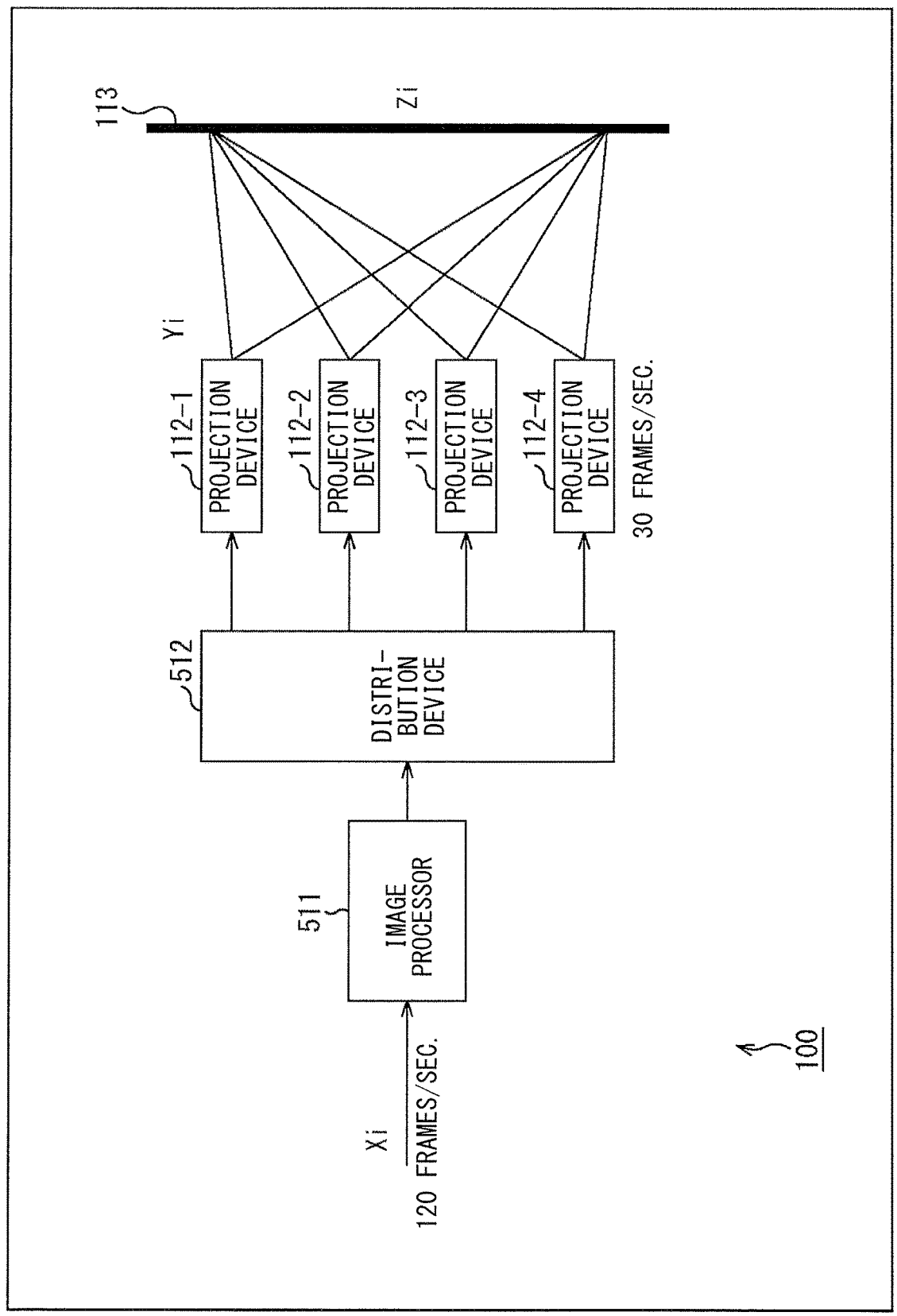
FIG. 27 is a block diagram illustrating a main configuration example of an image projection system.

Further, as illustrated in FIG. 27, for example, the image processor 121 and the distributor 122 included in the central processing unit 111 may each be an independent device, and the image projection system 100 may include an image processing device 511 and a distribution device 512, instead of the central processing unit 111.

Figure 28:
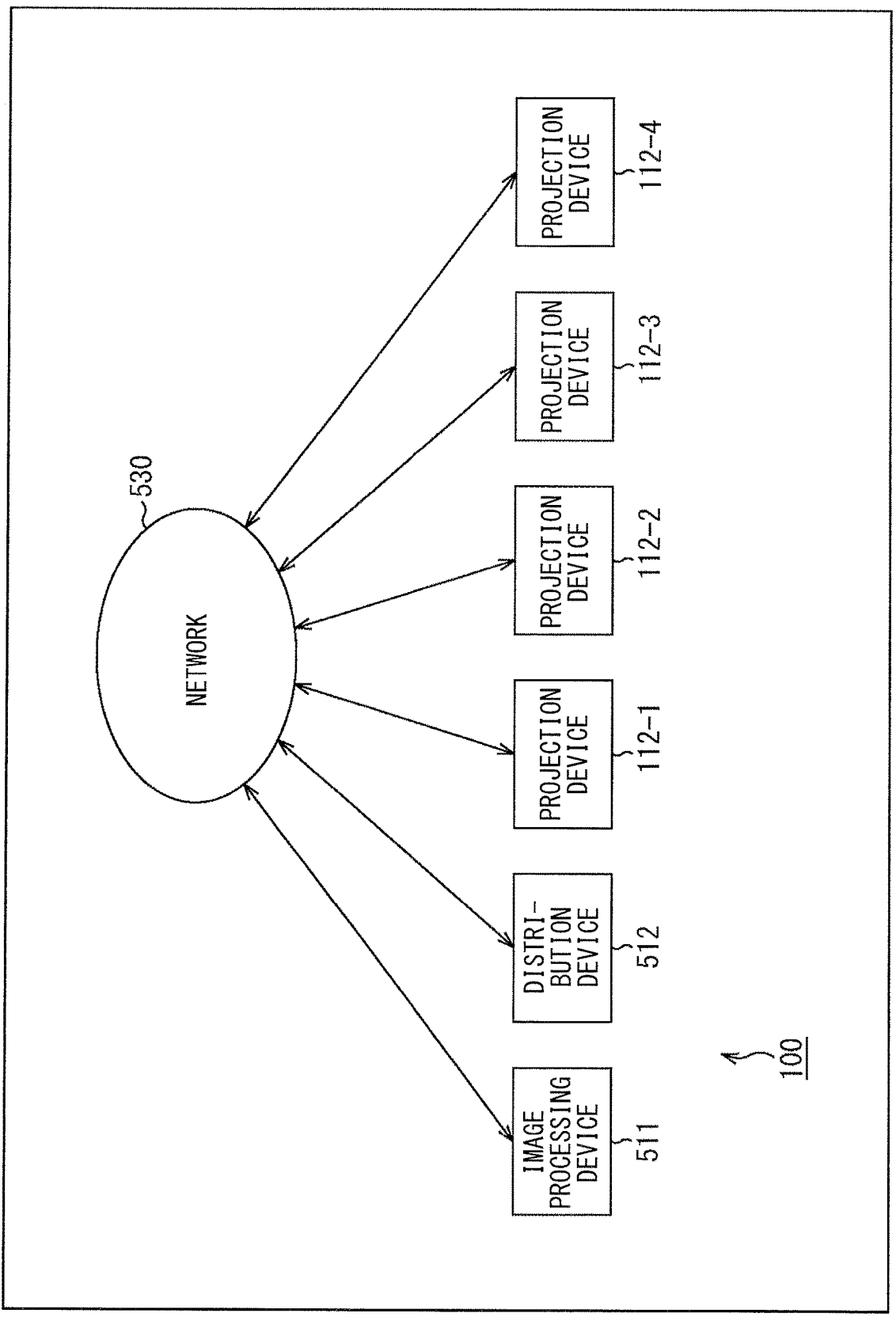
FIG. 28 is a block diagram illustrating a main configuration example of an image projection system.

Further, as illustrated in FIG. 28, the devices may be coupled to each other via a network 530. In the exemplary image projection system 100 illustrated in FIG. 28, the image processing device 511, the distribution device 512, and the projection devices 112 of FIG. 27 are coupled to each other via the network 530.

The network 530 is any communication network. A communication method employed in the network 530 may be any method. For example, the communication may be wired communication, wireless communication, or both. The network 530 may include a single communication network or a plurality of communication networks. For example, a communication network or a communication path of any communication standard may be included in the network 530, such as the Internet, a public telephone network, a wide area communication network for a wireless mobile unit such as a so-called 3G line or 4G line, a wireless communication network that performs communication conforming to the WAN (Wide Area Network), LAN (Local Area Network), Bluetooth (registered trademark) standard, a communication path of short-range wireless communication such as NFC (Near Field Communication), a communication path of infrared communication, a communication network of wired communication conforming to a standard such as HDMI (registered trademark) (High-Definition Multimedia Interface) or USB (Universal Serial Bus), or the like.

The devices are communicatively coupled to the network 530. This connection may be wired (i.e., connection via wired communication), wireless (i.e., connection via wireless communication), or both. The devices are able to communicate with each other (exchange data, etc.) via the network 530. In other words, the devices may be communicatively coupled to each other via other equipment (such as devices or transmission lines). Also in the case of such a configuration, the present technology is applicable to the image projection system 100 similarly to the case of the above-described other embodiments, and it is possible to exhibit the above-described effects.

In the example of FIG. 28, the central processing unit 111 of FIG. 5 may be provided instead of the image processing device 511 and the distribution device 512.

Figure 29:
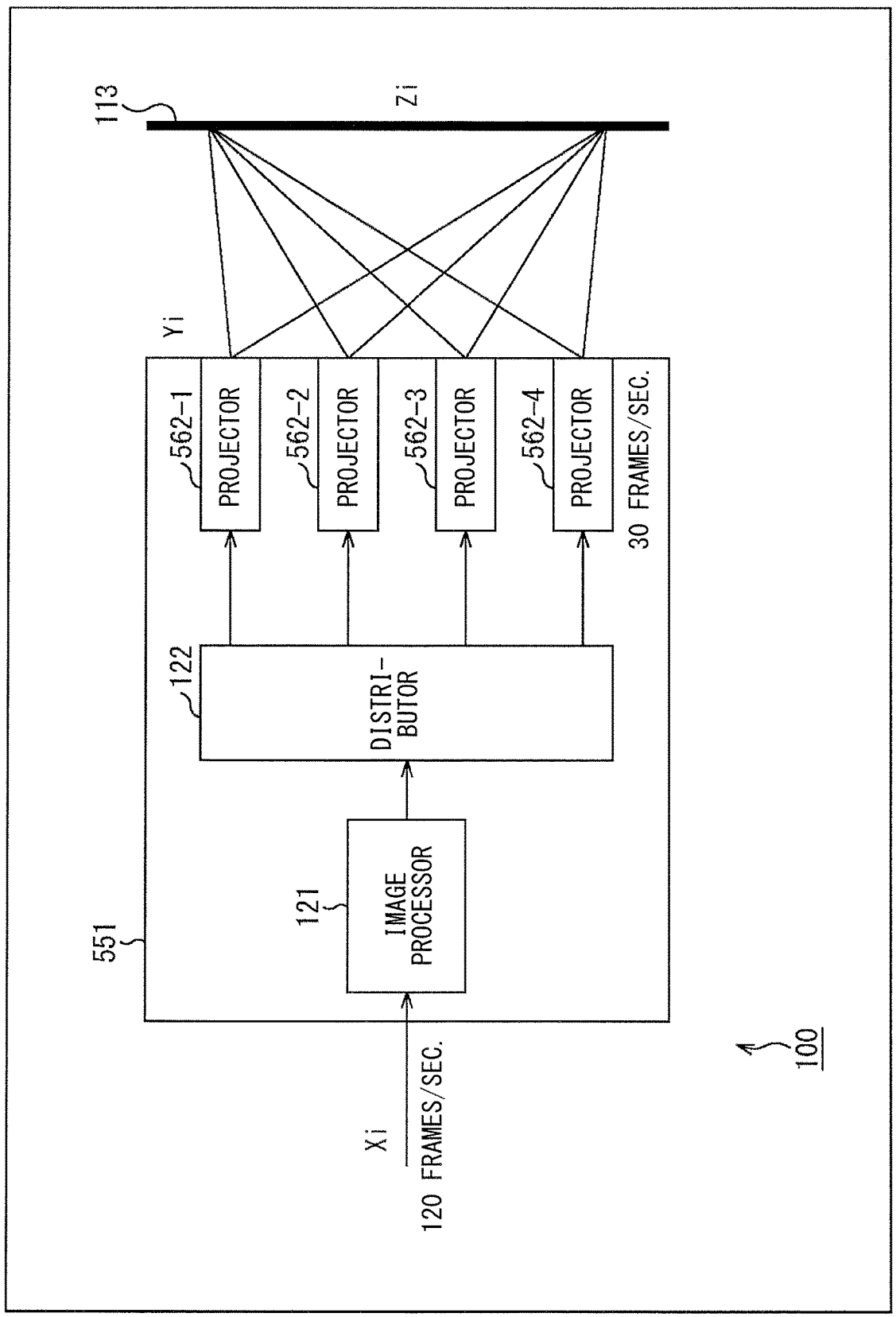
FIG. 29 is a block diagram illustrating a main configuration example of an image projection system.

Further, as illustrated in FIG. 29, for example, the entire configuration of the image projection system 100 may be configured as one device. An image projection device 551 illustrated in FIG. 29 has the image processor 121, the distributor 122 and projectors 562-1 to 562-4.

The projectors 562-1 to 562-4 are the processors similar to each other, and are each referred to as projector 562 in a case where it is not necessary that they be described separately from each other. The projector 562 performs the process similar to that of the projection device 112, and projects the frame image distributed to itself.

Therefore, the present technology is applicable to the image projection device 551 similarly to the case of the image projection system 100, and it is possible to exhibit the above-mentioned effects. Of course, the configuration of the image projection device 551 is optional and is not limited to the example of FIG. 29. For example, the number of image processors 121, the number of distributors 122, and the number of projectors 562 are optional. The specifications (e.g., resolution, brightness, frame rate, etc.) of the respective projection devices 112 may or may not be the same.

Figure 30:
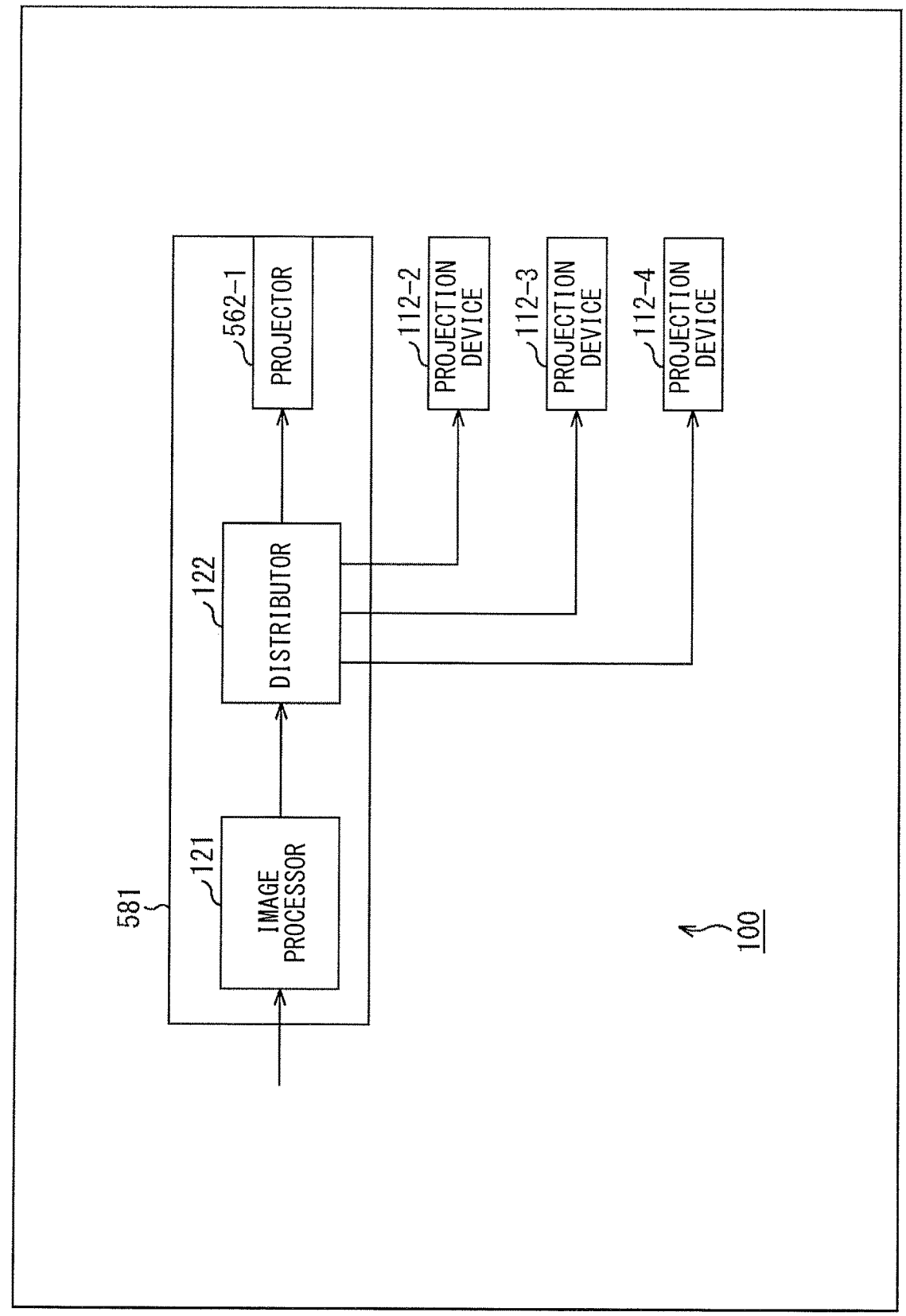
FIG. 30 is a block diagram illustrating a main configuration example of an image projection system.

Further, as illustrated in FIG. 30, for example, the image processor 121, the distributor 122, and some of the projection devices 112 may be configured as one device. An image projection device 581 illustrated in FIG. 30 includes the image processor 121, the distributor 122, and the projector 562-1. The distributor 122 is coupled not only to the projector 562-1 built in the image projection device 581 but also to the projection device 112-1, the projection device 112-3, and the projection device 112-4, which are provided outside. The distributor 122 cyclically distributes the frame images supplied from the image processor 121 to the projector 562-1 and the projection devices 112-1 to 112-4. The present technology is also applicable to the image projection device 581 similarly to the case of the image projection system 100, and it is possible to exhibit the above-mentioned effects.

[Another Configuration 2]

In the similar manner, the configuration of the image projection system 300 to which the present technology is applied is not limited to the above-described examples. For example, the number of control devices 301, the number of projection devices 302, and the number of stereoscopic devices 303 are optional.

In the similar manner to the example of FIG. 27, the image processor 351, the projection controller 352, and the shutter controller 353 included in the control device 301 may each be an independent device.

Further, in the similar manner to the example of FIG. 28, the respective devices may be coupled to each other via the network 530.

Further, in the similar manner to the example of FIG. 29, the control device 301 and the projection device 302 may be configured as one device. Further, in a case where the number of projection devices 302 is two or more, the control device 301 and some of the projection devices 302 may be configured as one device in the similar manner to the example of FIG. 30.

Moreover, the control device 301 and the stereoscopic device 303 may be configured as one device. Further, in a case where the number of stereoscopic devices 303 is two or more, the control device 301 and some of the stereoscopic devices 303 may be configured as one device. Of course, the control device 301, the projection device 302, and the stereoscopic device 303 may be configured as one device.

8. Others

[Frame Rate]

The frame rates of the input image, the output image outputted from each projector or each projection device, and the projection image projected on the screen are optional, and are not limited to the examples described above. For example, the frame rates of the input image and the projection image may be different from each other.

[Field to Which Present Technology is Applied]

The present technology is applicable to, for example, a system, an apparatus, a processing unit, or the like used in any field such as transportation, medical care, crime prevention, agriculture, livestock industry, mining, beauty, factory, household appliances, weather, natural surveillance, or the like as long as it processes an image.

For example, the present technology is applicable to a system or a device used for viewing. Further, for example, the present technology is also applicable to a system or a device used for traffic management. Further, for example, the present technology is applicable to a system or a device used for security. Further, for example, the present technology is applicable to a system or a device used for sports. Further, for example, the present technology is applicable to a system or a device used for agriculture. Further, for example, the present technology is also applicable to a system or a device used for livestock industry. Further, the present technology is applicable to a system or a device for monitoring a natural condition such as a volcano, a forest, or an ocean. The present technology is applicable to, for example, a weather observation system and a weather observation apparatus that observe weather, temperature, humidity, wind speed, sunshine time, and the like. Further, the present technology is applicable to, for example, a system or a device for observing the ecology of wildlife such as birds, fish, reptiles, amphibians, mammals, insects, plants, or the like.

[Software]

It is possible to execute the series of processes described above by hardware or software. It is also possible to cause a part of processing to be executed by hardware and another part of processing to be executed by software. In a case where the series of processes is executed by software, a program configuring the software is installed in the computer. Here, the computer includes, for example, a computer incorporated in dedicated hardware, a general-purpose personal computer which is able to execute various functions by installing various programs, or the like.

Figure 31:
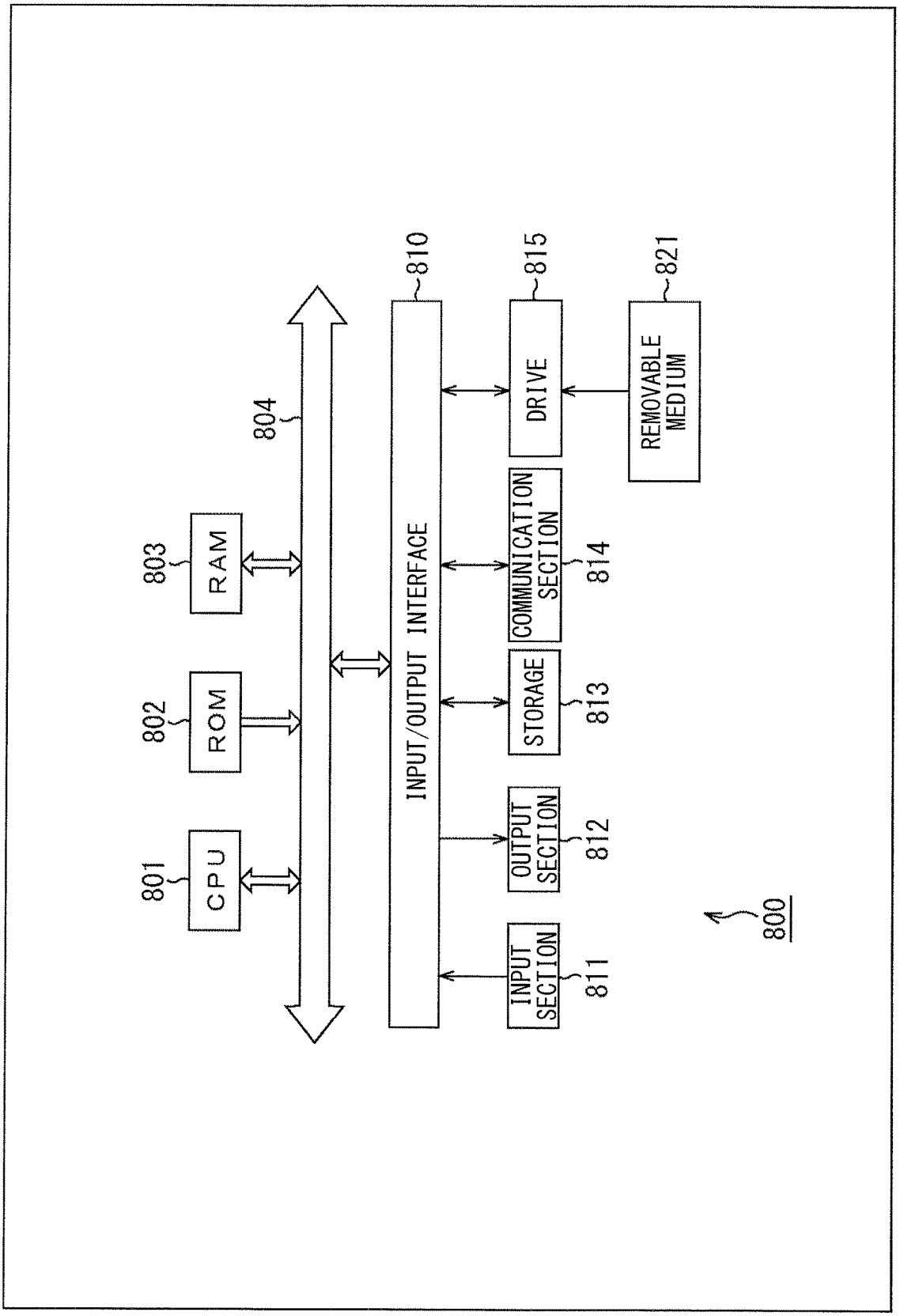
FIG. 31 is a block diagram illustrating a main configuration example of a computer.

FIG. 31 is a block diagram illustrating a configuration example of hardware of a computer in which the series of processes described above are executed by programs.

In a computer 800 illustrated in FIG. 31, a CPU (Central Processing Unit) 801, a ROM (Read Only Memory) 802, a RAM (Random Access Memory) 803 are coupled to each other via a bus 804.

Also coupled to the bus 804 is an input/output interface 810. An input section 811, an output section 812, a storage 813, a communication section 814, and a drive 815 are connected to the input/output interface 810.

The input section 811 includes, for example, a keyboard, a mouse, a microphone, a touch panel, an input terminal, and the like. The output section 812 includes, for example, a display, a speaker, an output terminal, and the like. The storage 813 includes, for example, a hard disk, a RAM disk, and a nonvolatile memory. The communication section 814 includes, for example, a network interfaces. The drive 815 drives a removable medium 821 such as a magnetic disk, an optical disc, a magneto-optical disk, a semi-conductor memory, or the like.

In the computer configured as described above, for example, the CPU 801 loads a program stored in the storage 813 into the RAM 803 via the input/output interface 810 and the bus 804 and executes the program, thereby performing the series of processes described above. The RAM 803 also stores data and the like as appropriate for the CPU 801 to execute various processes.

The programs to be executed by the computer (CPU 801) is applicable by being recorded in the removable medium 821 as a packaged medium or the like, for example. In that case, it is possible to install the program on the storage 813 via the input/output interface 810 by attaching the removable medium 821 to the drive 815. Further, the program may also be provided via a wired or wireless transmission medium, such as a local area network, the Internet, or digital satellite broadcasting. In that case, it is possible to receive the program by the communication section 814 and to install the program on the storage 813. In addition, the program may be installed in advance on the ROM 802 or the storage 813.

[Supplement]

The embodiment of the present technology is not limited to the embodiments described above, and various modifications can be made without departing from the gist of the present technology.

For example, the present technology may be implemented as a configuration that configures a device or a system, for example, a processor as a system LSI (Large Scale Integration) or the like, a module using a plurality of processors or the like, a unit using a plurality of modules or the like, a set in which another function is added to the unit, or the like.

It is to be noted that in this specification, a system means a set of a plurality of components (devices, modules (parts), and the like), and whether or not all of the components are in the same housing is not limited. Thus, a plurality of devices housed in separate housings and coupled via a network, and a plurality of modules housed in one housing, are both systems.

In addition, for example, the configuration described as one device (or processor) may be divided and configured as a plurality of devices (or processors). Conversely, the configurations described above as a plurality of devices (or processors) may be collectively configured as one device (or processor). Further, it is of course possible that a configuration other than that described above may be added to the configuration of each device (or each processor). Further, if the configuration and operation of the entire system are substantially the same, a part of the configuration of one device (or processor) may be included in the configuration of another device (or another processor).

For example, the present technology may have a configuration of cloud computing in which one function is shared and processed jointly by a plurality of devices via a network.

Further, for example, the above-described program can be executed in any device. In that case, the device may have a necessary function (function block), so that the device is able to acquire necessary information.

Further, for example, steps described in the above flowcharts may be performed by a plurality of devices in addition to being performed by one device. Further, in a case where a plurality of processes is included in one step, it is possible to execute the plurality of processes included in the one step with one device, and it is also possible to distribute the plurality of processes to a plurality of devices for execution. In other words, the plurality of processes included in one step may be executed as a plurality of steps. Conversely, the processes described as the plurality of steps may be collectively executed as one step.

A program executed by the computer may be executed so that the processes in steps describing the program are executed in a time-sequential manner in accordance with the order described in the present specification, or may be executed in parallel or individually at required timings such as when a call is made. That is, as long as there is no inconsistency, the processes of the steps may be executed in an order different from the order described above. Further, the processes of the steps describing the program may be executed in parallel with the processes of other programs, or may be executed in combination with the processes of other programs.

The plurality of present techniques described herein may each be implemented independently and singly, as long as there is no inconsistency. Of course, any of the plurality of present techniques may be implemented in combination. For example, some or all of the present techniques described in any embodiment may be combined with some or all of the present techniques described in other embodiments. Also, any of some or all of the present techniques described above may also be implemented in conjunction with other techniques not described above.

It is to be noted that the present technology may have the following configurations.

(1)

An image processing device including
a controller that controls, on a basis of each frame image of a moving image, a time during which a projection image of each frame image of the moving image is viewable by a user.

(2)

The image processing device according to (1), in which the controller controls the time during which the projection image is viewable by the user, to cause a difference between the moving image and the projection image due to a reduction in a luminance and a difference between the moving image and the projection image, which increases due to an increase in the time during which the projection image is viewable by the user, to be suppressed.

(3)

The image processing device according to (2), in which the difference between the moving image and the projection image, which increases due to the increase in the time during which the projection image is viewable by the user, is a difference that occurs due to superimposition of projection images of a plurality of frame images.

(4)

The image processing device according to (3), in which the plurality of frame images includes frame images differing in time points from each other in the moving image.

(5)

The image processing device according to (3) or (4), in which the plurality of frame images includes a right-eye frame image and a left-eye frame image.

(6)

The image processing device according to any one of (1) to (5), in which the controller controls the time during which the projection image is viewable by the user, to cause a sum in an entire image of differences between the moving image and the projection image determined for the respective pixels to be minimized.

(7)

The image processing device according to (6), in which the controller
estimates an output luminance value on a basis of an input luminance value, the output luminance value being a luminance value outputted by the projector, the input luminance value being a luminance value of the moving image,
estimates a projection luminance value which is a luminance value of the projection image, on a basis of the output luminance value that has been estimated and a constraint of the output luminance value in accordance with the time during which the projection image is viewable by the user,
determines a difference between the moving image and the projection image for each pixel on a basis of the input luminance value and the projection luminance value that has been estimated, and
controls the time during which the projection image is viewable by the user, to cause a sum in an entire image of differences between the moving image and the projection image determined for the respective pixels to be minimized.

(8)

The image processing device according to (7), in which the controller estimates the output luminance value by a filtering operation.

(9)

The image processing device according to (7) or (8), in which the controller estimates the output luminance value by optimization by linear programming.

(10)

The image processing device according to any one of (7) to (9), in which the controller limits a maximum value of the output luminance value depending on a percentage of the time during which the projection image is viewable by the user to a case where the time during which the projection image is viewable by the user is maximum.

(11)

The image processing device according to any one of (7) to (10), in which the controller estimates the projection luminance value by using a blur coefficient, the blur coefficient indicating a state of blurring due to overlapping of projection images of a plurality of frame images.

(12)

The image processing device according to any one of (7) to (11), in which the controller estimates the difference between the moving image and the projection image, on a basis of the input luminance value and the projection luminance value of each of all the frame images that are superimposed upon each other.

(13)

The image processing device according to (6), in which the controller
estimates, as a first difference, a difference between the moving image and the projection image due to a reduction in a luminance for each pixel,
estimates, as a second difference, a difference between the moving image and the projection image, which increases due to an increase in the time during which the projection image is viewable by the user, for each pixel,
calculates a sum in an entire image of the first differences and the second differences, and
controls the time during which the projection image is viewable by the user, to cause the sum to be minimized.

(14)

The image processing device according to (13), in which the controller estimates the first difference on a basis of a length of the time during which the projection image is viewable by the user.

(15)

The image processing device according to (14), in which the controller estimates the first difference depending on a percentage of the time during which the projection image is viewable by the user to a case where the time during which the projection image is viewable by the user is maximum.

(16)

The image processing device according to any one of (13) to (15), in which the controller estimates the second difference on a basis of a difference between an attentional pixel and a peripheral pixel.

(17)
The image processing device according to any one of (1) to (16), in which the controller controls the time during which the projection image is viewable by the user for each frame image of the moving image.
(18)
The image processing device according to any one of (1) to (17), in which the controller controls the time during which the projection image of each frame image of the moving image is viewable by the user, at when a plurality of projectors cyclically projects the frame images of the moving image.
(19)
The image processing device according to (18), in which the controller controls an output time of each frame image of the moving image, the frame images being outputted by the plurality of projectors.
(20)
The image processing device according to any one of (1) to (19), in which the controller controls a time during which each of projection images of a right-eye frame image and a left-eye frame image of the moving image is viewable, at when the right-eye frame image and the left-eye frame image of the moving image are viewed through a stereoscopic device, the stereoscopic device sequentially projecting the right-eye frame image and the left-eye frame image of the moving image and having a light-shielding mechanism that alternately performs light-shielding for a right eye and light-shielding for a left eye in accordance with timings of projecting the right-eye frame image and the left-eye frame image of the moving image, to allow the user to stereoscopically view the moving image.
(21)
The image processing device according to (20), in which the controller controls a time during which the light-shielding for the right eye and the light-shielding for the left eye are overlapped.
(22)
The image processing device according to any one of (1) to (21), in which the controller further performs, with respect to each frame image before being projected, an image process that suppresses an influence caused by superimposition of a plurality of frame images in the projection image of each frame image of the moving image.
(23)
The image processing device according to (22), in which the controller performs an image process that corrects a pixel value of each frame image.
(24)
The image processing device according to (23), in which the controller corrects a pixel value to cause an error between a frame image and a projection image to be minimized.
(25)
The image processing device according to (24), in which the controller corrects the pixel value for each line of each frame image of the moving image.
(26)
The image processing device according to any one of (1) to (25), further including a distributor that cyclically distributes frame images of the moving image to a plurality of projectors.
(27)
The image processing device according to (26), further including the plurality of projectors that projects frame images that have been distributed to the plurality of projectors by the distributor.

(28)
The image processing device according to (27), in which the plurality of projectors projects frame images that have been distributed to the plurality of projectors at a frame rate lower than a frame rate of the moving image.
(29)
The image processing device according to any one of (1) to (28), further including: a projector that sequentially projects a right-eye frame image and a left-eye frame image of the moving image; and
a stereoscopic section that has a light-shielding mechanism that alternately performs light-shielding for a right eye and light-shielding for a left eye in accordance with timings at which the projector projects the right-eye frame image and the left-eye frame image of the moving image, to cause the moving image to be stereoscopically viewable.
(30)
An image processing method including
controlling, on a basis of each frame image of a moving image, a time during which a projection image of each frame image of the moving image is viewable by a user.

REFERENCE SIGNS LIST

100: image projection system
111: central processing unit
112: projection device
113: screen
121: image processor
122: distributor
131: storage
132: output time calculator
201: output calculator
211: learning section
212: predictor
300: image projection system
301: control device
302: projection device
303: stereoscopic device
310: screen
321: left-eye light-shielding section
322: right-eye light-shielding section
351: image processor
352: projection controller
353: shutter controller
511: image processing device
512: distribution device
530: network
551: image projection device
562: projector
581: image projection device
800: computer

The invention claimed is:
1. An image processing device comprising
a controller configured to
control, on a basis of each frame image of a moving image, a time during which a projection image of each frame image of the moving image is viewable by a user, and
control the time during which the projection image is viewable by the user, to cause a difference between the moving image and the projection image due to a reduction in a luminance and a difference between the moving image and the projection image, which increases due to an increase in the time during which the projection image is viewable by the user, to be suppressed, wherein the controller is implemented via at least one processor.

2. The image processing device according to claim 1, wherein the difference between the moving image and the projection image, which increases due to the increase in the time during which the projection image is viewable by the user, is a difference that occurs due to superimposition of projection images of a plurality of frame images.

3. The image processing device according to claim 2, wherein the plurality of frame images includes frame images differing in time points from each other in the moving image.

4. The image processing device according to claim 2, wherein the plurality of frame images includes a right-eye frame image and a left-eye frame image.

5. The image processing device according to claim 1, wherein the controller is further configured to control the time during which the projection image is viewable by the user, to cause a sum in an entire image of differences between the moving image and the projection image determined for respective pixels to be minimized.

6. The image processing device according to claim 1, wherein the controller is further configured to control the time during which the projection image is viewable by the user for each frame image of the moving image.

7. The image processing device according to claim 1, wherein the controller is further configured to control the time during which the projection image of each frame image of the moving image is viewable by the user, at when a plurality of projectors cyclically projects a plurality of frame images of the moving image.

8. The image processing device according to claim 7, wherein the controller is further configured to control an output time of each frame image of the moving image, the plurality of frame images being outputted by the plurality of projectors.

9. The image processing device according to claim 1, wherein the controller is further configured to control a time during which each of projection images of a right-eye frame image and a left-eye frame image of the moving image is viewable, at when the right-eye frame image and the left-eye frame image of the moving image are viewed through a stereoscopic device, the stereoscopic device sequentially projecting the right-eye frame image and the left-eye frame image of the moving image and having a light-shielding mechanism that alternately performs light-shielding for a right eye and light-shielding for a left eye in accordance with timings of projecting the right-eye frame image and the left-eye frame image of the moving image, to allow the user to stereoscopically view the moving image.

10. The image processing device according to claim 9, wherein the controller is further configured to control a time during which the light-shielding for the right eye and the light-shielding for the left eye are overlapped.

11. The image processing device according to claim 1, wherein the controller is further configured to perform, with respect to each frame image before being projected, an image process that suppresses an influence caused by superimposition of a plurality of frame images in the projection image of each frame image of the moving image.

12. The image processing device according to claim 11, wherein the controller is further configured to perform an image process that corrects a pixel value of each frame image.

13. The image processing device according to claim 12, wherein the controller is further configured to correct a pixel value to cause an error between a frame image and a projection image to be minimized.

14. The image processing device according to claim 13, wherein the controller is further configured to correct the pixel value for each line of each frame image of the moving image.

15. The image processing device according to claim 1, further comprising
a distributor configured to cyclically distribute frame images of the moving image to a plurality of projectors, wherein the distributor is implemented via at least one processor.

16. The image processing device according to claim 15, further comprising
the plurality of projectors that projects frame images that have been distributed to the plurality of projectors by the distributor.

17. The image processing device according to claim 16, wherein the plurality of projectors projects frame images that have been distributed to the plurality of projectors at a frame rate lower than a frame rate of the moving image.

18. The image processing device according to claim 1, further comprising:
a projector that sequentially projects a right-eye frame image and a left-eye frame image of the moving image; and
a stereoscopic section that has a light-shielding mechanism that alternately performs light-shielding for a right eye and light-shielding for a left eye in accordance with timings at which the projector projects the right-eye frame image and the left-eye frame image of the moving image, to cause the moving image to be stereoscopically viewable.

19. An image processing method comprising
controlling, on a basis of each frame image of a moving image, a time during which a projection image of each frame image of the moving image is viewable by a user; and
controlling the time during which the projection image is viewable by the user, to cause a difference between the moving image and the projection image due to a reduction in a luminance and a difference between the moving image and the projection image, which increases due to an increase in the time during which the projection image is viewable by the user, to be suppressed.

20. A non-transitory computer-readable medium having embodied thereon a program, which when executed by a computer causes the computer to execute an image processing method, the method comprising:
controlling, on a basis of each frame image of a moving image, a time during which a projection image of each frame image of the moving image is viewable by a user; and
controlling the time during which the projection image is viewable by the user, to cause a difference between the moving image and the projection image due to a reduction in a luminance and a difference between the moving image and the projection image, which increases due to an increase in the time during which the projection image is viewable by the user, to be suppressed.

* * * * *